(12) United States Patent
Ikuta et al.

(10) Patent No.: US 12,077,074 B2
(45) Date of Patent: Sep. 3, 2024

(54) SEAT AIR-CONDITIONING DEVICE

(71) Applicant: DENSO CORPORATION, Kariya (JP)

(72) Inventors: Haruki Ikuta, Kariya (JP); Shuji Ito, Kariya (JP); Hironobu Murakami, Kariya (JP); Shouji Obara, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/983,183

(22) Filed: Nov. 8, 2022

(65) Prior Publication Data

US 2023/0068742 A1 Mar. 2, 2023

Related U.S. Application Data

(63) Continuation of application No. PCT/JP2021/019437, filed on May 21, 2021.

(30) Foreign Application Priority Data

Jun. 30, 2020 (JP) ................... 2020-113131

(51) Int. Cl.
*A47C 31/00* (2006.01)
*B60N 2/56* (2006.01)
*B60N 2/58* (2006.01)

(52) U.S. Cl.
CPC ................. *B60N 2/5657* (2013.01)

(58) Field of Classification Search
CPC .. B60N 2/5657; B60N 2/5635; B60N 2/5642; B60N 2/565; B60N 2/56; B60N 2/5621; B60N 2/5628; B60N 2/5891; B60H 1/00285
See application file for complete search history.

(56) References Cited

U.S. PATENT DOCUMENTS

| | | | | |
|---|---|---|---|---|
| 6,105,667 A | * | 8/2000 | Yoshinori | B60N 2/5657 219/202 |
| 6,179,706 B1 | * | 1/2001 | Yoshinori | B60N 2/5657 297/180.14 |
| 6,277,023 B1 | * | 8/2001 | Schwarz | B60N 2/5635 297/452.47 |

(Continued)

FOREIGN PATENT DOCUMENTS

| | | |
|---|---|---|
| JP | 2009077760 A | 4/2009 |
| JP | 2013184625 A | 9/2013 |
| JP | 2019038461 A | 3/2019 |

*Primary Examiner* — Shin H Kim
(74) *Attorney, Agent, or Firm* — Harness, Dickey & Pierce, P.L.C.

(57) ABSTRACT

A seat air-conditioning device is applied to a seat and includes a cushion material, an outer cover, a ventilation hole and a surface groove. The cushion material supports a back or buttocks of an occupant seated on the seat. The outer cover covers the cushion material and has perforation holes. The ventilation hole is formed at a portion of the cushion material opposed to the back or the buttocks of the occupant seated on the seat. The ventilation hole is configured to suction or blow air. The surface groove is formed at a portion of the cushion material which is adjacent to the outer cover. The surface groove is communicated with the ventilation hole and extends from the ventilation hole in a direction away from a location of the cushion material, at which a center of the back or a center of the buttocks of the occupant is placed.

8 Claims, 12 Drawing Sheets

(56) References Cited

U.S. PATENT DOCUMENTS

| | | | | |
|---|---|---|---|---|
| 6,481,801 B1 * | 11/2002 | Schmale | ............... | B60N 2/5635 |
| | | | | 297/180.12 |
| 6,629,725 B1 * | 10/2003 | Kunkel | ................ | B60N 2/5635 |
| | | | | 297/452.47 |
| 6,848,742 B1 * | 2/2005 | Aoki | .................... | B60N 2/5635 |
| | | | | 454/120 |
| 6,976,734 B2 * | 12/2005 | Stoewe | ................ | B60N 2/5657 |
| | | | | 297/180.13 |
| 7,108,319 B2 * | 9/2006 | Hartwich | ............. | B60N 2/5635 |
| | | | | 297/180.16 |
| 7,114,771 B2 * | 10/2006 | Lofy | .................... | B60N 2/5657 |
| | | | | 297/180.13 |
| 7,201,441 B2 * | 4/2007 | Stoewe | ................ | B60N 2/5635 |
| | | | | 297/180.13 |
| 7,261,371 B2 * | 8/2007 | Thunissen | ............ | B60N 2/5635 |
| | | | | 297/452.42 |
| 8,522,704 B2 * | 9/2013 | Graham | ............... | B60N 2/5891 |
| | | | | 112/475.01 |
| 9,073,466 B2 * | 7/2015 | Ota | ....................... | B60N 2/5664 |
| 9,403,460 B2 * | 8/2016 | Hickey | .................. | B60N 2/565 |
| 9,440,572 B2 * | 9/2016 | Hall | ...................... | B60N 2/5657 |
| 9,744,890 B2 * | 8/2017 | Nii | ....................... | B60N 2/5678 |
| 10,343,567 B1 * | 7/2019 | Reel | ........................ | B68G 7/05 |
| 10,589,647 B2 * | 3/2020 | Wolas | ................ | B60H 1/00285 |
| 10,773,615 B2 * | 9/2020 | McElroy | ............ | B60H 1/00285 |
| 11,173,816 B2 * | 11/2021 | Zhang | .................. | B60N 2/5657 |
| 11,707,909 B2 * | 7/2023 | Spillner | .......... | B60N 2/79 |
| | | | | 701/36 |
| 11,787,317 B2 * | 10/2023 | Abe | ...................... | B60N 2/5642 |
| | | | | 297/452.47 |
| 2006/0060344 A1 * | 3/2006 | Esaki | ................... | B60N 2/5825 |
| | | | | 165/287 |
| 2009/0079236 A1 | 3/2009 | Itou et al. | | |
| 2012/0080911 A1 * | 4/2012 | Brykalski | ............ | B60N 2/5657 |
| | | | | 297/180.15 |
| 2012/0315132 A1 * | 12/2012 | Axakov | ................ | B60N 2/5642 |
| | | | | 415/182.1 |
| 2014/0159442 A1 * | 6/2014 | Helmenstein | ........ | B60N 2/5671 |
| | | | | 454/120 |
| 2015/0183348 A1 * | 7/2015 | Zhang | ..................... | B60N 2/56 |
| | | | | 297/180.13 |
| 2016/0144754 A1 * | 5/2016 | Bauer | .................... | B60N 2/565 |
| | | | | 297/452.47 |
| 2018/0022251 A1 * | 1/2018 | Kienzler | .............. | B60N 2/5657 |
| | | | | 297/180.12 |
| 2018/0170225 A1 * | 6/2018 | Izukawa | ............... | B60N 2/5883 |
| 2018/0345634 A1 * | 12/2018 | Schaefer | ................ | B32B 27/40 |
| 2019/0152362 A1 * | 5/2019 | Kondo | .................... | B60N 2/565 |
| 2021/0323453 A1 * | 10/2021 | Übelacker | ............... | B60N 2/56 |
| 2022/0332227 A1 * | 10/2022 | Goto | ..................... | B60N 2/565 |
| 2023/0150405 A1 * | 5/2023 | Henn | ..................... | B60N 2/58 |
| | | | | 297/180.1 |

\* cited by examiner

SEAT AIR-CONDITIONING DEVICE

CROSS REFERENCE TO RELATED APPLICATIONS

This application is a continuation application of International Patent Application No. PCT/JP2021/019437 filed on May 21, 2021, which designated the U.S. and claims the benefit of priority from Japanese Patent Application No. 2020-113131 filed on Jun. 30, 2020. The entire disclosures of all of the above applications are incorporated herein by reference.

TECHNICAL FIELD

The present disclosure relates to a seat air-conditioning device applied to a seat installed in a cabin of a vehicle.

BACKGROUND

There has been previously proposed a seat air-conditioning device which improves a comfortable feeling of an occupant seated on a seat by suctioning or blowing air from a plurality of ventilation holes formed at the seat installed in the cabin of the vehicle.

The previously proposed seat air-conditioning device is constructed such that a plurality of elliptical ventilation holes are formed at a back pad of the seat, and the air is suctioned through the ventilation holes.

However, in the previously proposed seat air-conditioning device, when the ventilation holes are blocked by a back of the occupant seated on the seat, a flow rate of the air, which is suctioned from the vicinity of the back of the occupant into the ventilation holes, is reduced. Therefore, the occupant does not feel cool, and thereby the comfortable feeling of the occupant decreases.

SUMMARY

This section provides a general summary of the disclosure, and is not a comprehensive disclosure of its full scope or all of its features.

According to the present disclosure, there is provided a seat air-conditioning device applied to a seat installed in a cabin of a vehicle. The seat air-conditioning device includes a cushion material, an outer cover, a ventilation hole and a surface groove. The cushion material is configured to support a back or buttocks of an occupant seated on the seat. The outer cover covers the cushion material and has a plurality of perforation holes. The ventilation hole is formed at a portion of the cushion material which is opposed to the back or the buttocks of the occupant seated on the sea. The ventilation hole is configured to suction or blow air. The surface groove is formed at a portion of the cushion material which is adjacent to the outer cover. The surface groove is communicated with the ventilation hole.

BRIEF DESCRIPTION OF DRAWINGS

The drawings described herein are for illustrative purposes only of selected embodiments and not all possible implementations, and are not intended to limit the scope of the present disclosure.

DETAILED DESCRIPTION

Figure 1:
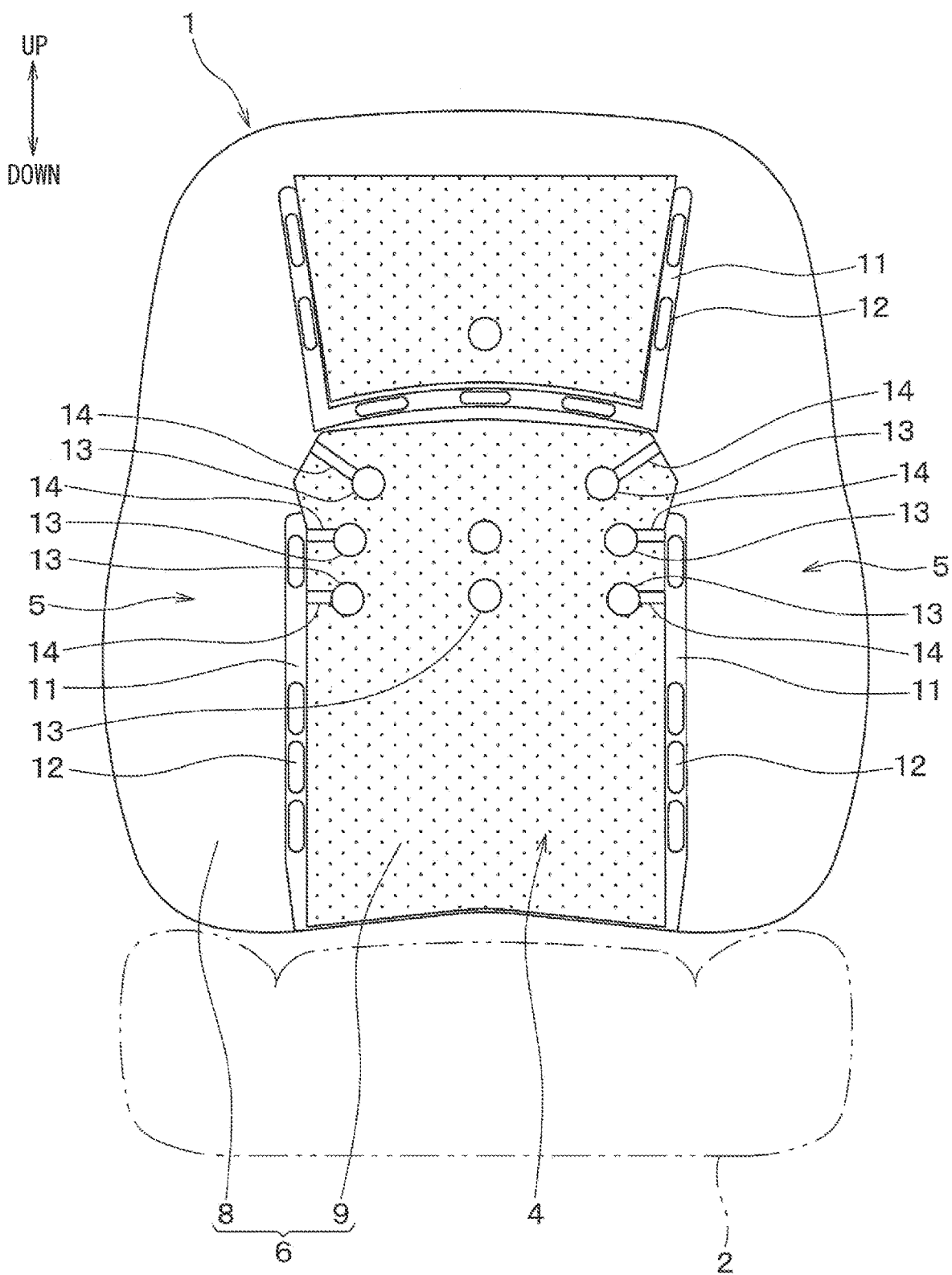
FIG. 1 is a front view showing a seat back, to which a seat air-conditioning device of a first embodiment is applied, in a state where an outer cover is removed from the seat back.
Figure 2:
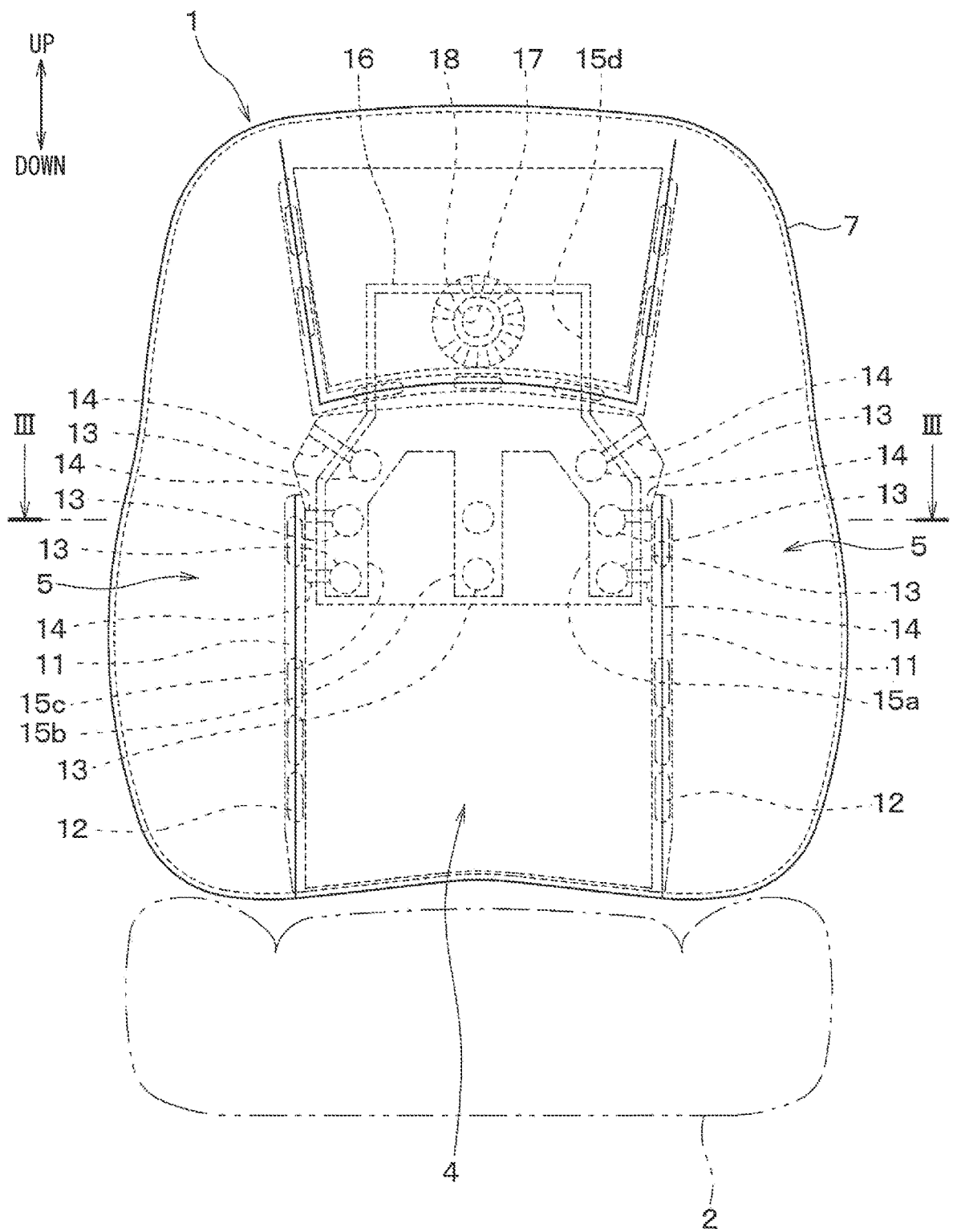
FIG. 2 is a front view showing the seat back, to which the seat air-conditioning device of the first embodiment is applied.

There has been previously proposed a seat air-conditioning device which improves a comfortable feeling of an occupant seated on a seat by suctioning or blowing air from a plurality of ventilation holes formed at the seat installed in the cabin of the vehicle.

The previously proposed seat air-conditioning device is constructed such that a plurality of elliptical ventilation holes are formed at a back pad of the seat, and the air is suctioned through the ventilation holes. The ventilation holes are referred to air communication holes.

However, in the previously proposed seat air-conditioning device, when the ventilation holes are blocked by a back of the occupant seated on the seat, a flow rate of the air, which is suctioned from the vicinity of the back of the occupant into the ventilation holes, is reduced. Therefore, the occupant does not feel cool, and thereby the comfortable feeling of the occupant decreases.

When an inner diameter of the respective ventilation holes is increased or the number of the ventilation holes is increased to address the above disadvantage, the portion of the back pad, at which the ventilation holes are formed, may be sunken in response to the seating of the occupant on the seat to possibly cause the deterioration in the seating comfort of the occupant.

According to one aspect of the present disclosure, there is provided a seat air-conditioning device applied to a seat installed in a cabin of a vehicle. The seat air-conditioning device includes a cushion material, an outer cover, a ventilation hole and a surface groove. The cushion material is configured to support a back or buttocks of an occupant seated on the seat. The outer cover covers the cushion material and has a plurality of perforation holes. The ventilation hole is formed at a portion of the cushion material which is opposed to the back or the buttocks of the occupant seated on the seat. The ventilation hole is configured to suction or blow air. The surface groove is formed at a portion of the cushion material which is adjacent to the outer cover. The surface groove is communicated with the ventilation hole and extends from the ventilation hole in a direction away from a location of the cushion material, at which a center of the back or a center of the buttocks of the occupant seated on the seat is placed.

According to this configuration, the portion of the cushion material, which is spaced away from the location of the cushion material of the seat back where the center of the back or the center of the buttocks of the occupant seated on the seat is placed, is the portion of the cushion material, at which the seating pressure of the occupant seated on the seat is relatively low. That is, the surface groove extends from the ventilation hole toward the portion of the cushion material, at which the seating pressure of the occupant seated on the seat is relatively low. Therefore, even when some of the perforation holes, which are placed on the side of the ventilation hole in the axial direction of the ventilation hole, are blocked by the body of the occupant, the air flows from the other perforation holes, which are placed at the location where the surface groove is placed, to the ventilation hole through the surface groove. Thus, since the decrease in the flow rate of the air, which flows in the vicinity of the body of the occupant, is limited, the occupant can feel cooler, and thereby the occupant can feel more comfortable.

Furthermore, the surface groove extends to the portion of the cushion material, at which the seating pressure of the occupant seated on the seat is relatively low, and also the depth of the surface groove is smaller than the depth of the ventilation hole. Therefore, the seating comfort of the occupant is hardly affected.

The location of the cushion material, at which the center of the back or the center of the buttocks of the occupant seated on the seat is placed, is the center location of the cushion material which is centered in the left-to-right direction of the vehicle (i.e., the vehicle width direction) in the state where the seat is installed in the cabin of the vehicle.

Hereinafter, embodiments of the present disclosure will be described with reference to the drawings. In each of the following embodiments, portions, which are the same or equivalent to each other, will be indicated by the same reference signs. It should be noted that up and down arrows, rear and front arrows in the respective drawings, and the terms upper, lower, front and rear in the following description are used for convenience to describe an example of a seat air-conditioning device and are not intended to limit the present disclosure.

First Embodiment

Hereinafter, a first embodiment of the present disclosure will be described with reference to the drawings. A seat air-conditioning device of the present embodiment is applied to a seat installed in a cabin of a vehicle.

As shown in FIGS. 1 to 4, the seat includes: a seat back 1 which is configured to support a back of an occupant; a seat cushion 2 which is configured to support buttocks of the occupant; and a headrest (not shown) which is configured to support a head of the occupant.

The seat air-conditioning device of the present embodiment is applied to the seat back 1 of the seat. The seat back 1 includes: a center portion 4 which is placed to oppose the back of the occupant 3 seated on the seat; and two side supports 5 which are located on two opposite sides, respectively, of the center portion 4. The center portion 4 of the seat back 1 is also referred to as a backrest surface or a seat surface.

The seat back 1 of the present embodiment includes: a cushion material 6 which is configured to support the back of the occupant 3 seated on the seat; and an outer cover (also referred to as a seat cover) 7 which covers the cushion material 6. The cushion material 6 of the present embodiment includes a seat pad 8 and a soft urethane foam layer 9. FIG. 1 shows the seat back 1 in a state where the outer cover 7 is removed from the seat back 1 while the soft urethane foam layer 9 is indicated with a plurality of dots.

The seat pad 8 is made of a urethane foam material and constitutes most of the center portion 4 and the side supports 5. The seat pad 8 is formed by, for example, molding.

The soft urethane foam layer 9 is made of a urethane foam material that has a hardness lower than a hardness of the urethane foam material of the seat pad 8. The soft urethane foam layer 9 is located on a side of the seat pad 8 where the outer cover 7 is placed. The soft urethane foam layer 9 is formed by, for example, foaming a urethane and then cutting and molding the urethane (that is, slab molding). Therefore, the material of the soft urethane foam layer 9 is also called a slab urethane. A thickness of the soft urethane foam layer 9 is relatively thin and is, for example, about 1 to 5 mm.

A three-dimensional net may be used in place of the soft urethane foam layer 9. The three-dimensional net is a cushioning material that has a three-dimensional knitted structure which is excellent in cushioning property, breathability and body pressure dispersibility.

Figure 4:
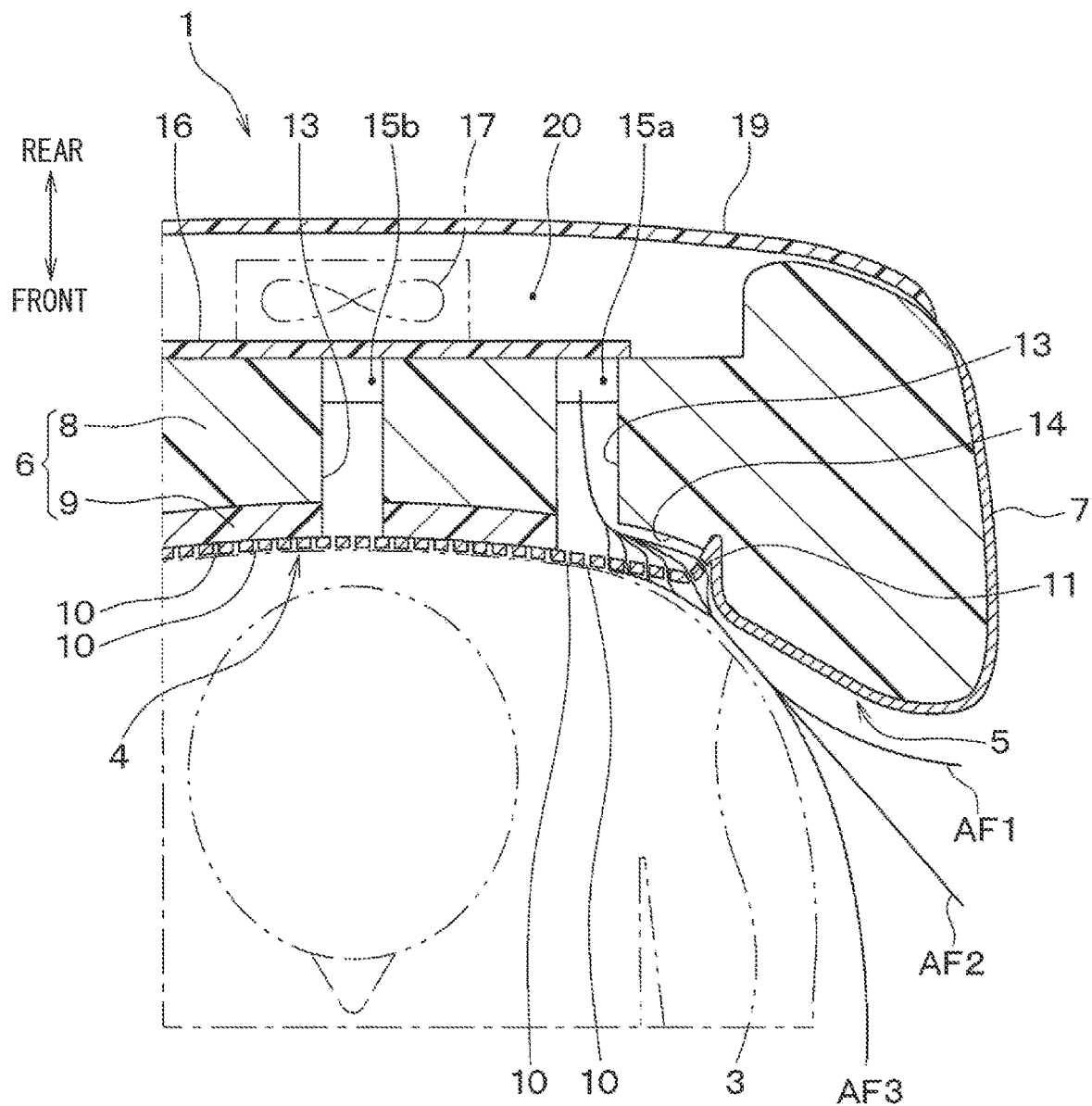
FIG. 4 is an enlarged view of a portion IV in FIG. 3.

The outer cover 7 is made of, for example, fabric or leather and covers at least the occupant 3 side surface and lateral surfaces of the cushion material 6. As shown in FIG. 4, the outer cover 7 of the present embodiment has a plurality of fine holes, which are referred to as a plurality of perforation holes 10, in at least the center portion 4.

The seat has a plurality of hanging grooves 11 for coupling the cushion material 6 to the outer cover 7. Each of the hanging grooves 11 is a portion for hanging (coupling) a string, which is provided at the outer cover 7, to a wire 12 embedded in the seat pad 8. Each of the hanging grooves 11 is provided at a portion of the seat back 1, which forms a recess. Therefore, some of the hanging grooves 11 are respectively provided at two boundaries, each of which is located between the center portion 4 and a corresponding one of the side supports 5.

The seat air-conditioning device of the present embodiment includes a plurality of ventilation holes 13 and a plurality of surface grooves 14 formed at the cushion material 6 of the seat back 1.

In the cushion material 6, the ventilation holes 13 are formed at a portion (i.e., the center portion 4) of the seat pad 8 which is opposed to the back of the occupant 3 seated on the seat. Specifically, the ventilation holes 13 include: three ventilation holes 13 which are arranged in the up-to-down direction at a left side of the center portion 4; three ventilation holes 13 which are arranged in the up-to-down direction at a right side of the center portion 4; and three ventilation holes 13 which are arranged in the up-to-down direction at a center of the center portion 4. Each of the ventilation holes 13 extends in a seat front-to-rear direction (i.e., a thickness direction of the seat back 1).

A rear groove 15 is formed at a rear side portion of the seat pad 8. The rear groove 15 is a ventilation passage that communicates with the ventilation holes 13. Specifically, the rear groove 15 includes: three grooves 15a-15c which extend generally in the up-to-down direction; and a space 15d which is shaped generally in a rectangle and is communicated with the grooves 15a-15c. The grooves 15a-15c, which extend generally in the up-to-down direction, are communicated with the ventilation holes 13. Therefore, the space 15d, which is shaped generally in the rectangle, is also communicated with the ventilation holes 13 through the three grooves 15a-15c.

A back lid 16 is installed to a portion of the rear side of the seat pad 8 which corresponds to the rear groove 15. The back lid 16 is made of resin, such as hard felt, polypropylene or POM, and is bonded to a rear surface of the seat pad 8 such that the back lid 16 closes an open surface of the rear groove 15. A blower 17 is located on a rear side of the back lid 16. The back lid 16 has an opening hole 18 at a location that corresponds to an air suction port of the blower 17.

A back frame 19 is installed on a rear side of the blower 17. An outer periphery of the back frame 19 is joined to the seat pad 8. A space is formed between the back lid 16 and the back frame 19. This space will be referred to as a seat back space 20.

The blower 17 is installed in the seat back space 20. The blower 17 is a fan that generates an air flow by rotating an impeller which is driven by an electric motor (not shown). A centrifugal fan is used as the impeller. Alternatively, an axial flow fan, a mixed flow fan or a turbofan may be used as the impeller. The blower 17 is configured to blow the air, which is suctioned from the perforation holes 10 of the outer cover 7 through the surface grooves 14, the ventilation holes 13 and the rear groove 15, into the seat back space 20.

The surface grooves 14 are formed at a portion of the cushion material 6 which is adjacent to the outer cover 7. In the present embodiment, each of the surface grooves 14 is a cutout formed by removing (i.e., cutting off) a part of the soft urethane foam layer 9 of the cushion material 6 (specifically, a cutout which is formed at the part of the soft urethane foam layer 9 and extends through the part of the soft urethane foam layer 9 in a thickness direction of the soft urethane foam layer 9). Therefore, the surface grooves 14 are relatively shallow grooves.

In the case where the three-dimensional net is used in place of the soft urethane foam layer 9, each of the surface grooves 14 may be a cutout formed by removing (i.e., cutting off) a part of the three-dimensional net (specifically, a cutout which is formed at the part of the three-dimensional net and extends through the part of the three-dimensional net in a thickness direction of the three-dimensional net).

Each of the surface grooves 14 is communicated with a portion of a corresponding one of the ventilation holes 13 while the portion of the corresponding one of the ventilation holes 13 is placed adjacent to the outer cover 7. Specifically, the surface grooves 14 include: three surface grooves 14 which are respectively communicated with the three ventilation holes 13 arranged at the left side; and three surface grooves 14 which are respectively communicated with the three ventilation holes 13 arranged at the right side. The surface grooves 14 are not provided to the three ventilation holes 13 arranged at the center.

Each of the surface grooves 14 extends linearly (and is thereby unbent) from the corresponding ventilation hole 13 in a direction away from a location of the cushion material 6, at which the center of the back of the occupant 3 seated on the seat is placed. Specifically, two of the surface grooves 14, which are respectively communicated with the left and right uppermost ventilation holes 13, extend from the left and right uppermost ventilation holes 13 toward the left and right side supports 5, respectively. Furthermore, two of the surface grooves 14, which are communicated with the left and right lower ventilation holes 13 located on the lower side of the uppermost ventilation holes 13, extend from the left and right lower ventilation holes 13 to the left and right hanging grooves 11, respectively. Specifically, each of the surface grooves 14 extends from the corresponding one of the ventilation holes 13 to the corresponding one of the side supports 5 or the corresponding one of the hanging grooves 11. Furthermore, each of the surface grooves 14, which are communicated with the left and right lower ventilation holes 13 located on the lower side of the uppermost ventilation holes 13, communicates between the corresponding one of the left and right lower ventilation holes 13 and the corresponding one of the left and right hanging grooves 11.

The portion of the cushion material 6, which is spaced away from the center of the back of the occupant 3 seated on the seat, has a seating pressure that is lower than a seating pressure of a portion of the cushion material 6 which supports the center of the back of the occupant 3. Specifically, the side supports 5 or the hanging grooves 11 are portions that have the seating pressure of the occupant 3 which is lower than the seating pressure of the occupant 3 at the center portion 4. Therefore, each of the surface grooves 14 extends from the corresponding ventilation hole 13 to the low-pressure side portion of the cushion material 6, at which the seating pressure of the occupant 3 is relatively low, without extending to the high-pressure side portion of the cushion material 6, at which the seating pressure of the occupant is relatively high.

The location of the cushion material 6, at which the center of the back or the center of the buttocks of the occupant 3 seated on the seat is placed, is the center location of the cushion material 6 which is centered in the left-to-right direction of the vehicle (i.e., the vehicle width direction) in the state where the seat is installed in the cabin of the vehicle.

Next, a flow of wind (a flow of air) at the structure of the seat air-conditioning device described above at the time of driving the blower 17 will be described.

As shown in FIG. 4, when the occupant 3 is seated on the seat, some of the perforation holes 10, which are placed on the side of the ventilation holes 13 (i.e., the side of the ventilation holes 13 where the occupant 3 is located) in the axial direction of the ventilation holes 13, are blocked by the back of the occupant 3. However, even in such a case, according to the present embodiment, an interior space of the cabin of the vehicle and the ventilation holes 13 are communicated with each other through the other perforation holes 10 at the location, which corresponds to the surface grooves 14, and these surface grooves 14. In the case where the surface grooves 14 are communicated with the hanging grooves 11, the interior space of the cabin of the vehicle and the ventilation holes 13 are communicated with each other through: the hanging grooves 11; the perforation holes 10 at the locations, which correspond to these hanging grooves 11 and these surface grooves 14; and these surface grooves 14.

Therefore, when the blower 17 is driven, as indicated by arrows AF1, AF2, AF3 in FIG. 4, the air flows through the interior space of the cabin of the vehicle, the hanging grooves 11, the perforation holes 10, the surface grooves 14, the ventilation holes 13, the rear groove 15, the blower 17 and the seat back space 20 in this order. At this time, a portion of the air may flow through the interior space of the cabin of the vehicle, the perforation holes 10, the surface grooves 14, the ventilation holes 13, the rear groove 15, the blower 17 and the seat back space 20 in this order without passing through the hanging grooves 11. As described above, when the air in the cabin of the vehicle flows from the perforation holes 10 in the vicinity of the back of the occupant 3 to the ventilation holes 13 through the surface grooves 14, the air flows sufficiently in the vicinity of the back of the occupant 3. Therefore, according to the present embodiment, even when some of the perforation holes 10, which are placed on the side of the ventilation holes 13 in the axial direction of the ventilation holes 13, are blocked by the back of the occupant 3, a decrease in the flow rate of the air in the vicinity of the back of the occupant 3 is limited, and thereby the occupant 3 can feel cooler.

Figure 3:
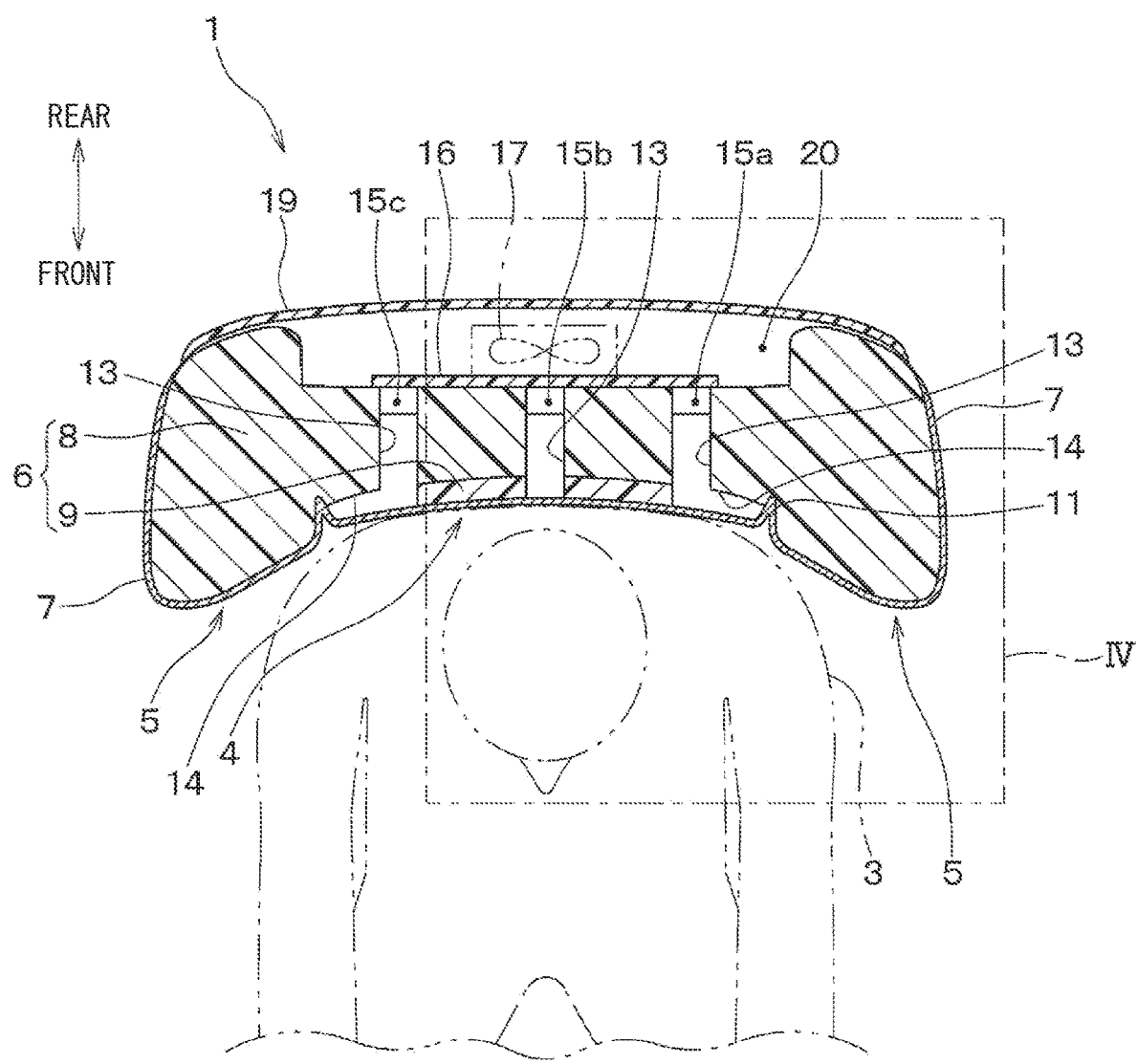
FIG. 3 is a cross-sectional view taken along line III-III in FIG. 2.

Furthermore, as shown in FIGS. 3 and 4, each of the surface grooves 14 extends to the corresponding low-pressure side portion of the cushion material 6, at which the seating pressure of the occupant 3 seated on the seat is relatively low, without extending to the high-pressure side portion of the cushion material 6, at which the seating pressure of the occupant seated on the seat is relatively high, and also the depth of each of the surface grooves 14 is smaller than the depth of the corresponding ventilation hole 13. Therefore, the seating comfort of the occupant 3 is hardly affected.

Next, a plurality of examples of the shape of the surface groove 14 of the seat air-conditioning device will be described with reference to FIGS. 5 to 10. FIGS. 5 to 10 also show the seat back 1 in the state where the outer cover 7 is removed from the seat back 1 while the soft urethane foam layer 9 is indicated with the dots. In the description of the examples with respect to the shape of the surface grooves 14, an alphabet is added at the end of the reference sign of the surface groove 14 in order to distinguish the shapes of the surface grooves 14 among these examples.

Figure 5:
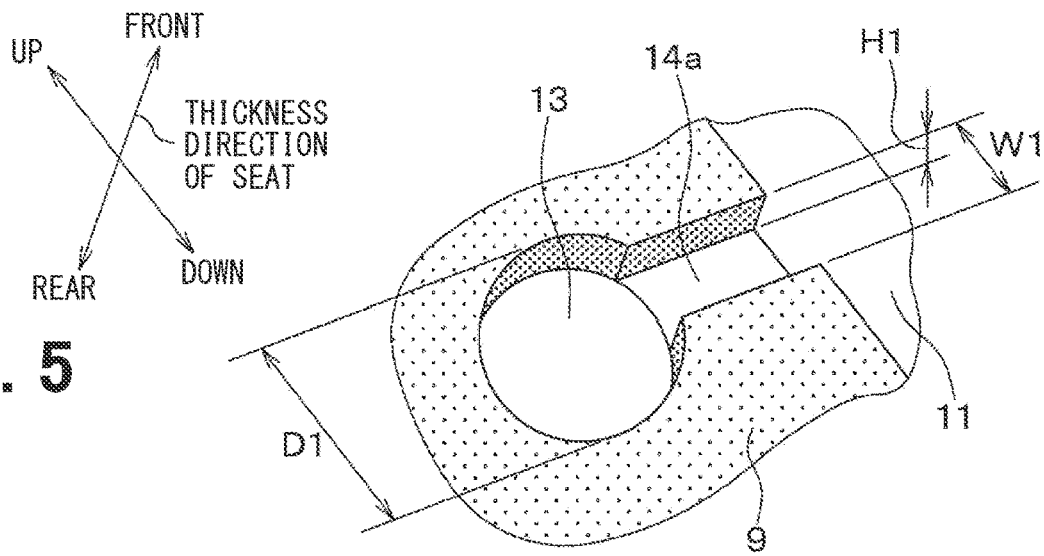
FIG. 5 is a perspective view showing an example of a surface groove of the seat air-conditioning device of the first embodiment.

In the example shown in FIG. 5, the surface groove 14a extends linearly from the ventilation hole 13 to the hanging groove 11. The width W1 of the surface groove 14a, which is measured in a direction parallel with the surface of the seat, is preferably set to be equal to or smaller than a half of a diameter D1 of the ventilation hole 13. The direction parallel with the surface of the seat is a direction parallel with a plane perpendicular to a thickness direction of the seat (i.e., a direction of a thickness of the seat). The thickness direction of the seat at the seat back 1 is a direction that substantially coincides with the front-to-rear direction of the vehicle in the state where the seat back 1 is upright. The influence on the seating comfort of the occupant 3 can be reduced by reducing the width W1 of the surface groove 14a measured in the direction parallel with the surface of the seat.

Furthermore, the surface groove 14a is the cutout formed by removing the part of the soft urethane foam layer 9. Therefore, the surface groove 14a is a groove that has a small depth H1, which is measured in the thickness direction of the seat. The influence on the seating comfort of the occupant 3 can also be reduced by reducing the depth H1 of the surface groove 14 measured in the thickness direction of the seat. This is also the case in the examples shown in FIGS. 6 to 10.

Figure 6:
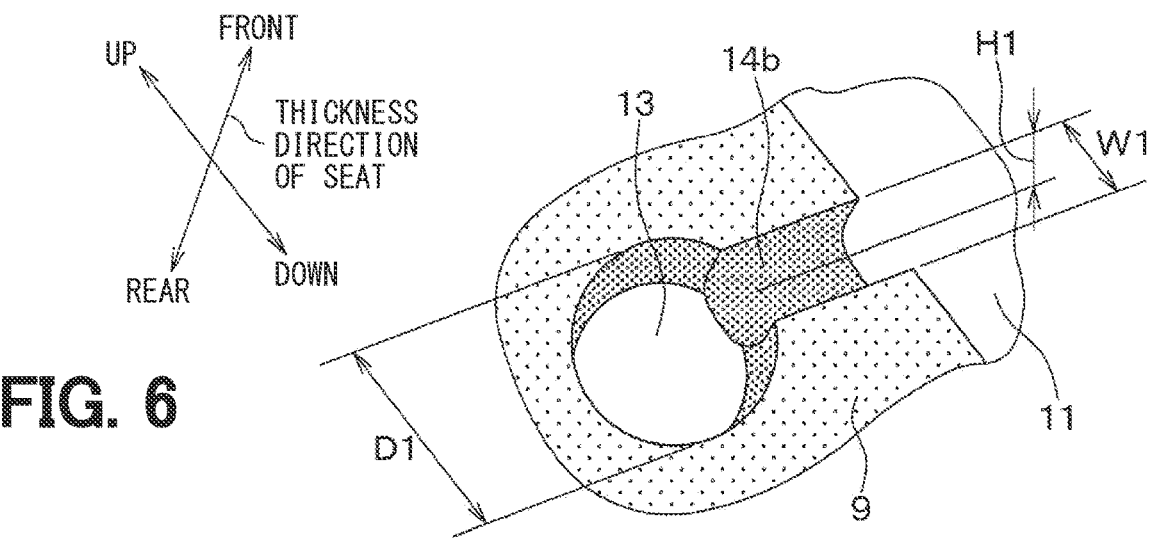
FIG. 6 is a perspective view showing another example of the surface groove of the seat air-conditioning device of the first embodiment.

Even in the example shown in FIG. 6, the surface groove 14b extends linearly from the ventilation hole 13 to the hanging groove 11. Furthermore, a cross-section of the surface groove 14b, which is perpendicular to an extending direction of the surface groove 14b, has a U-shape. The width W1 of the surface groove 14b, which is measured in the direction parallel with the surface of the seat, is preferably set to be equal to or smaller than the half of the diameter D1 of the ventilation hole 13.

Figure 7:
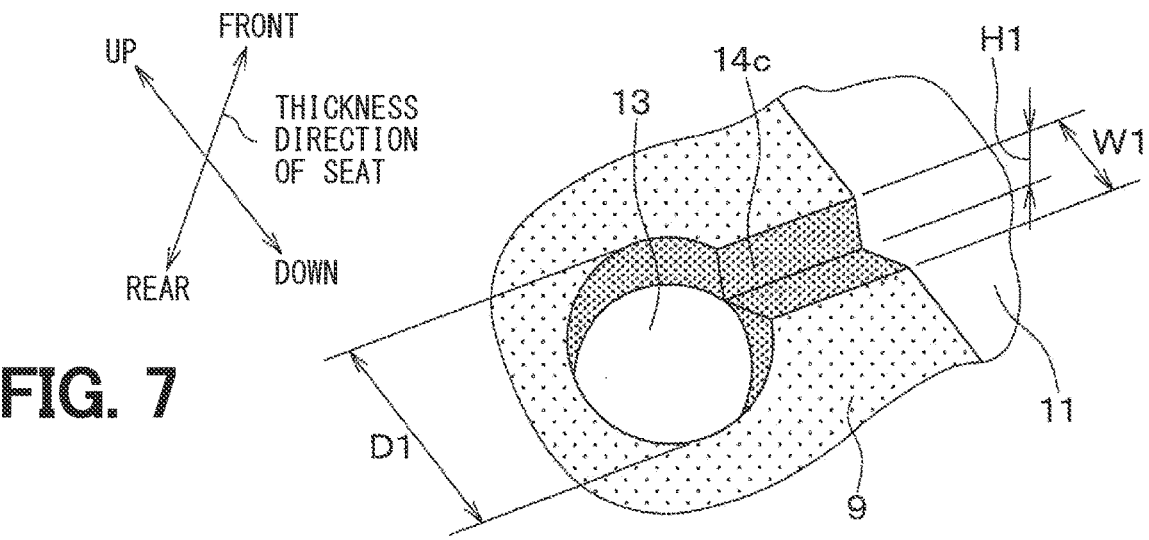
FIG. 7 is a perspective view showing another example of the surface groove of the seat air-conditioning device of the first embodiment.

Even in the example shown in FIG. 7, the surface groove 14c extends linearly from the ventilation hole 13 to the hanging groove 11. Furthermore, a cross-section of the surface groove 14c, which is perpendicular to the extending direction of the surface groove 14c, has a V-shape. The width W1 of the surface groove 14c, which is measured in the direction parallel with the surface of the seat, is preferably set to be equal to or smaller than the half of the diameter D1 of the ventilation hole 13.

Figure 8:
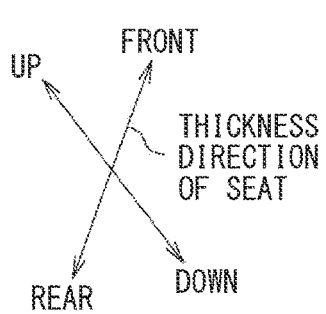
FIG. 8 is a perspective view showing another example of the surface groove of the seat air-conditioning device of the first embodiment.
Figure 8:
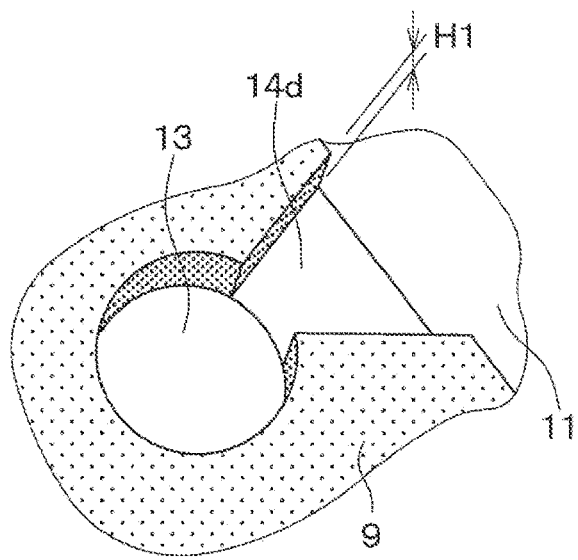

In the example shown in FIG. 8, the surface groove 14d is shaped such that the width of the surface groove 14d, which is measured in the direction parallel with the surface of the seat, is progressively increased from the ventilation hole 13 toward the hanging groove 11. Therefore, a flow passage cross-sectional area of the surface groove 14d is progressively increased from the high-pressure side portion, at which the seating pressure is relatively high, toward the low-pressure side portion, at which the seating pressure is relatively low. As a result, the flow rate of the air, which flows from the surface groove 14d to the ventilation hole 13, can be further increased without causing the substantial influence on the seating comfort of the occupant 3.

Figure 9:
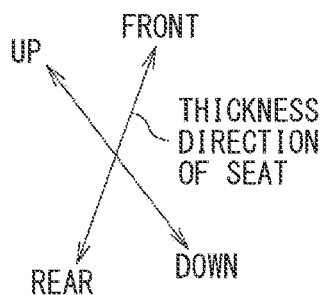
FIG. 9 is a perspective view showing another example of the surface groove of the seat air-conditioning device of the first embodiment.
Figure 9:
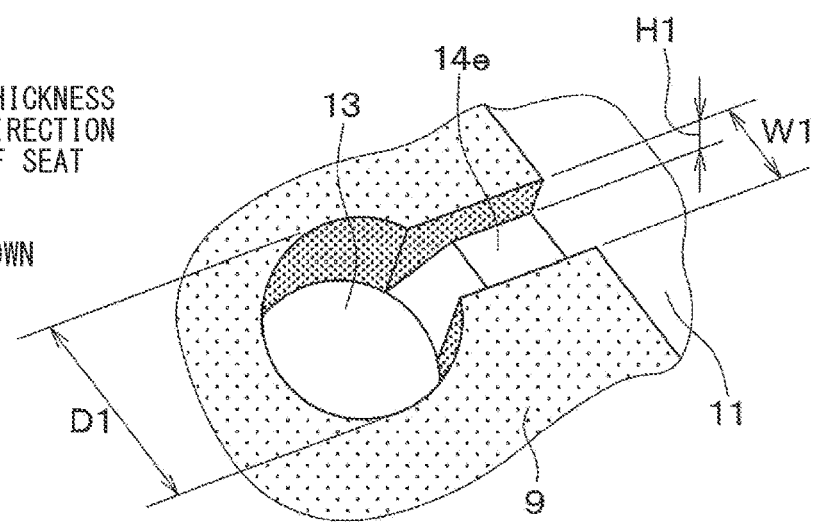

In the example shown in FIG. 9, the surface groove 14e includes a portion that has the depth which is measured in the thickness direction of the seat and is progressively increased from the side, at which the hanging groove 11 is placed, toward the ventilation hole 13. Thus, it is possible to reduce the pressure loss of the air, which flows from the surface groove 14e to the ventilation hole 13. As a result, the flow rate of the air, which flows from the surface groove 14e to the ventilation hole 13, can be further increased without causing the substantial influence on the seating comfort of the occupant 3 while the width W1 of the surface groove 14e, which is measured in the direction parallel with the surface of the seat, is kept small.

Figure 10:
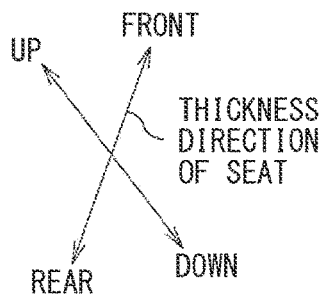
FIG. 10 is a perspective view showing another example of the surface groove of the seat air-conditioning device of the first embodiment.
Figure 10:
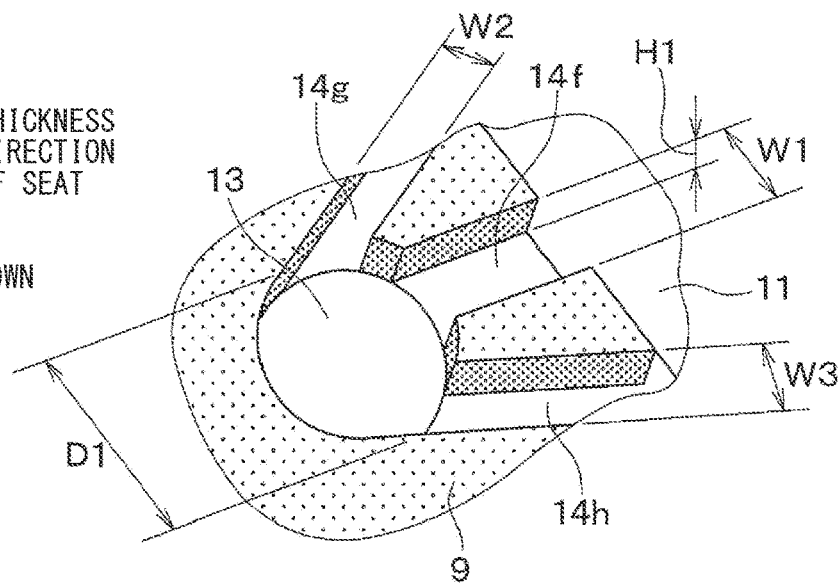

In the example shown in FIG. 10, three surface grooves 14f, 14g, 14h are provided to the one ventilation hole 13.

Each of the surface grooves 14f, 14g, 14h extends linearly from the ventilation hole 13 to the hanging groove 11. The width W1, W2, W3 of each surface groove 14f, 14g, 14h, which is measured in the direction parallel with the surface of the seat, is preferably set to be equal to or smaller than the half of the diameter D1 of the ventilation hole 13. Therefore, it is possible to increase the total flow passage cross-sectional area, which is a sum of the flow passage cross-sectional areas of the three surface grooves 14f, 14g, 14h, while the width W1, W2, W3 of each of the surface grooves 14f, 14g, 14h is kept small. As a result, a total flow rate of the air, which flows from the surface grooves 14f, 14g, 14h to the corresponding ventilation hole 13, can be further increased without causing the substantial influence on the seating comfort of the occupant 3.

As described above with reference to FIGS. 5 to 10, any one of the various shapes described above can be used as the shape of the surface grooves 14 of the seat air-conditioning device of the present embodiment.

The seat air-conditioning device of the present embodiment described above has the following advantages.

(1) In the present embodiment, the seat air-conditioning device includes the cushion material 6, the outer cover 7, the ventilation holes 13 and the surface grooves 14. The surface grooves 14 are formed at the portion of the cushion material 6, which is adjacent to the outer cover 7. Each of the surface grooves 14 extends from the corresponding one of the ventilation holes 13 in the direction away from the location of the cushion material 6, at which the center of the back of the occupant 3 seated on the seat is placed.

According to this configuration, the portion of the cushion material 6, which is spaced away from the center of the back of the occupant 3 seated on the seat is placed, is the portion of the cushion material 6, at which the seating pressure of the occupant 3 seated on the seat is relatively low. That is, each of the surface grooves 14 extends from the corresponding ventilation hole 13 toward the portion of the cushion material 6, at which the seating pressure of the occupant 3 seated on the seat is relatively low. Therefore, even when some of the perforation holes 10, which are placed on the side of the ventilation holes 13 in the axial direction of the ventilation holes 13, are blocked by the back of the occupant 3, the air flows from the other perforation holes 10, which are placed at the locations where the surface grooves 14 are placed, to the ventilation holes 13 through the surface grooves 14. Thus, since the decrease in the flow rate of the air, which flows in the vicinity of the back of the occupant 3, is limited, the occupant 3 can feel cooler, and thereby the occupant 3 can feel more comfortable.

Furthermore, each of the surface grooves 14 extends to the portion of the cushion material 6, at which the seating pressure of the occupant 3 seated on the seat is low, and also the depth of each of the surface grooves 14 is smaller than the depth of each of the ventilation holes 13. Therefore, the seating comfort of the occupant 3 is hardly affected.

(2) In the present embodiment, each of the surface grooves 14 extends from the corresponding one of the ventilation holes 13 to the corresponding one of the side supports 5 or the corresponding one of the hanging grooves 11.

According to this configuration, in the seat back 1, the side support 5 or the hanging groove 11 is the portion, at which the seating pressure of the occupant 3 seated on the seat is relatively low. Therefore, each of the surface grooves 14 extends to the corresponding portion of the cushion material 6, at which the seating pressure of the occupant 3 is low, and also the depth of each of the surface grooves 14 is smaller than the depth of each of the ventilation holes 13. Therefore, the seating comfort of the occupant 3 is hardly affected.

Furthermore, even when some of the perforation holes 10, which are placed on the side of the ventilation holes 13 in the axial direction of the ventilation holes 13, are blocked by the back of the occupant 3, the air flows from the other perforation holes 10, which are placed at the locations where the surface grooves 14 are placed, to the ventilation holes 13 through the surface grooves 14 while each of the surface grooves 14 is formed at the corresponding portion, at which the seating pressure of the occupant 3 is relatively low. Therefore, it is possible to limit a decrease in the flow rate of the air which flows in the vicinity of the back of the occupant 3.

(3) In the present embodiment, some of the surface grooves 14 communicate between the hanging grooves 11 and the ventilation holes 13.

According to this configuration, even when some of the perforation holes 10, which are placed on the side of the ventilation holes 13 in the axial direction of the ventilation holes 13, are blocked by the back of the occupant 3, the air flows from the other perforation holes 10, which are placed at the locations where the surface grooves 14 communicated with the hanging grooves 11 are placed, to the surface grooves 14 and the ventilation holes 13 through the hanging grooves 11. Therefore, it is possible to limit a decrease in the flow rate of the air which flows in the vicinity of the back of the occupant 3.

(4) In the present embodiment, the surface grooves 14 may be respectively shaped such that the width of the surface groove 14, which is measured in the direction parallel with the surface of the seat, is progressively increased from the corresponding ventilation hole 13 toward the corresponding side support 5 or the corresponding hanging groove 11.

According to this configuration, the flow passage cross-sectional area of the portion of the surface groove 14, at which the seating pressure of the occupant 3 is relatively low, is increased, and thereby the flow rate of the air, which flows from the surface groove 14 to the corresponding ventilation hole 13, can be increased without causing the substantial influence on the seating comfort of the occupant 3.

(5) In the present embodiment, the surface grooves 14 may be respectively shaped such that the surface groove 14 includes a portion that has the depth which is measured in the thickness direction of the seat and is progressively increased from the side, at which the corresponding side support 5 or the hanging groove 11 is placed, toward the corresponding ventilation hole 13.

According to this configuration, the flow rate of the air, which flows from the surface groove 14 to the corresponding ventilation hole 13, can be further increased by reducing the pressure loss of the air, which flows from the surface groove 14 to the corresponding ventilation hole 13, without causing the substantial influence on the seating comfort of the occupant 3.

(6) In the present embodiment, only one surface groove 14 may be provided for one ventilation hole 13, or a plurality of surface grooves 14 may be provided for one ventilation hole 13.

By providing only the one surface groove 14 for the one ventilation hole 13, the configuration can be simplified, and the influence on the seating comfort of the occupant 3 can be reduced.

Furthermore, by providing the plurality of surface grooves 14 for the one ventilation hole 13, it is possible to increase the total flow passage cross-sectional area, which is the sum of the flow passage cross-sectional areas of the plurality of surface grooves 14, while the width W1, W2, W3 of each of the surface grooves 14 is kept small. As a result, a total flow rate of the air, which flows from the plurality of surface grooves 14 to the corresponding ventilation hole 13, can be further increased without causing the substantial influence on the seating comfort of the occupant 3.

(7) In the present embodiment, each of the surface grooves 14 is the cutout formed by removing the part of the soft urethane foam layer 9 or the three-dimensional net.

According to this configuration, each of the surface grooves 14 can be easily formed by processing the soft urethane foam layer 9 or the three-dimensional net.

(8) In the present embodiment, each of the surface grooves 14 extends from the corresponding ventilation hole 13 to the corresponding low-pressure side portion of the cushion material 6, at which the seating pressure of the occupant 3 is relatively low, without extending to the high-pressure side portion of the cushion material 6, at which the seating pressure of the occupant is relatively high.

According to this configuration, even when some of the perforation holes 10, which are placed on the side of the ventilation holes 13 in the axial direction of the ventilation holes 13, are blocked by the back of the occupant 3, the air flows from the other perforation holes 10, which are placed at the locations where the surface grooves 14 are placed, to the ventilation holes 13 through the surface grooves 14. Thus, since the decrease in the flow rate of the air, which flows in the vicinity of the back of the occupant 3, is limited, the occupant 3 can feel cooler, and thereby the occupant 3 can feel more comfortable.

Furthermore, each of the surface grooves 14 does not extend to the high-pressure side portion of the cushion material 6, at which the seating pressure of the occupant 3 is relatively high, and also the depth of each of the surface grooves 14 is smaller than the depth of the corresponding ventilation hole 13. Therefore, the seating comfort of the occupant 3 is hardly affected.

Second Embodiment

Next, a second embodiment will be described. The second embodiment is a modification of a part of the structure of the cushion material 6 of the seat back 1 in comparison with the first embodiment, and the rest of the second embodiment is the same as that of the first embodiment. Therefore, only the parts different from those of the first embodiment will be described in the following description. FIG. 11 and FIGS. 13 to 18 of the second embodiment indicate the state where the outer cover 7 of the seat back 1 is removed.

Figure 11:
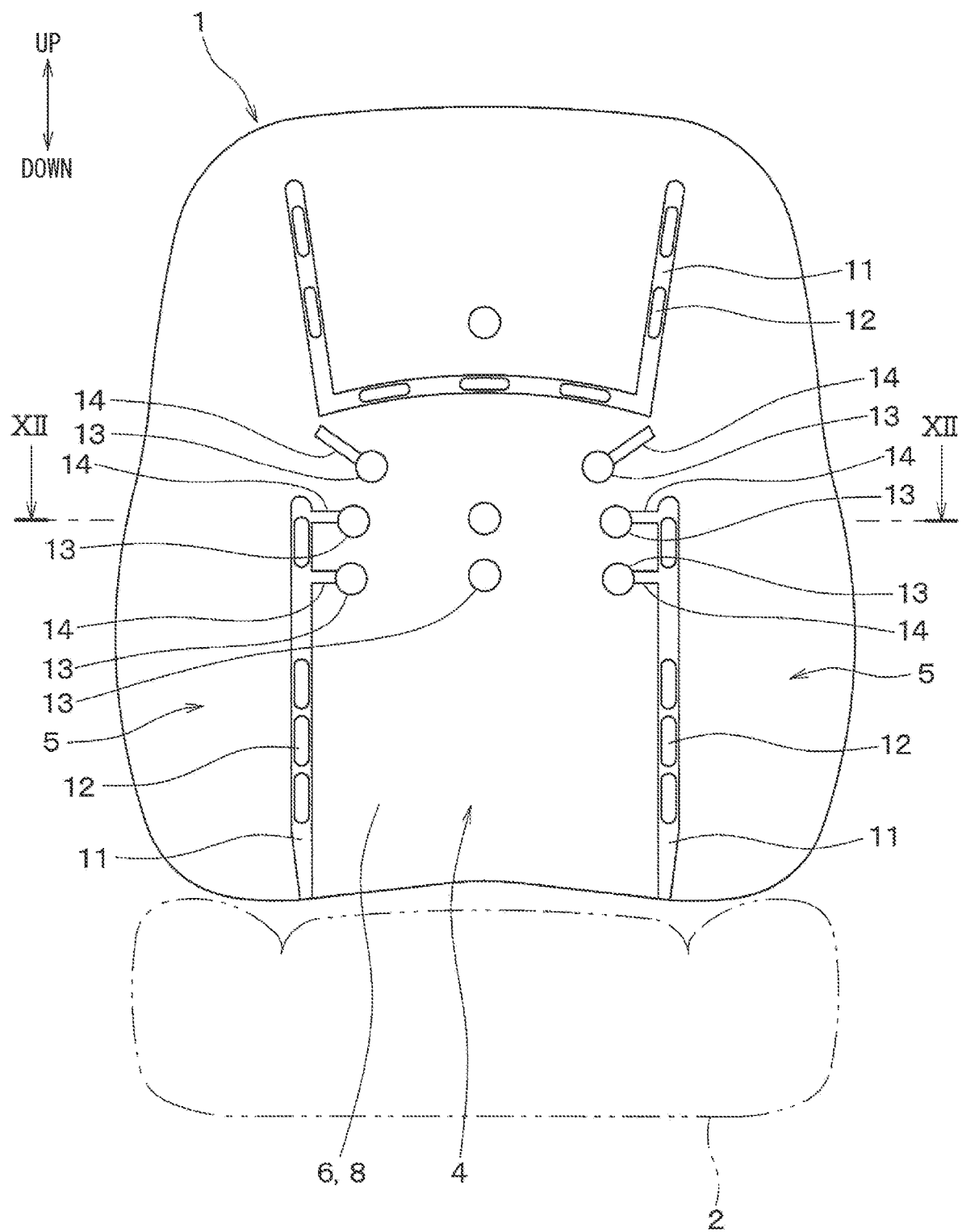
FIG. 11 is a front view showing a seat back, to which a seat air-conditioning device of a second embodiment is applied, in a state where an outer cover is removed from the seat back.
Figure 12:
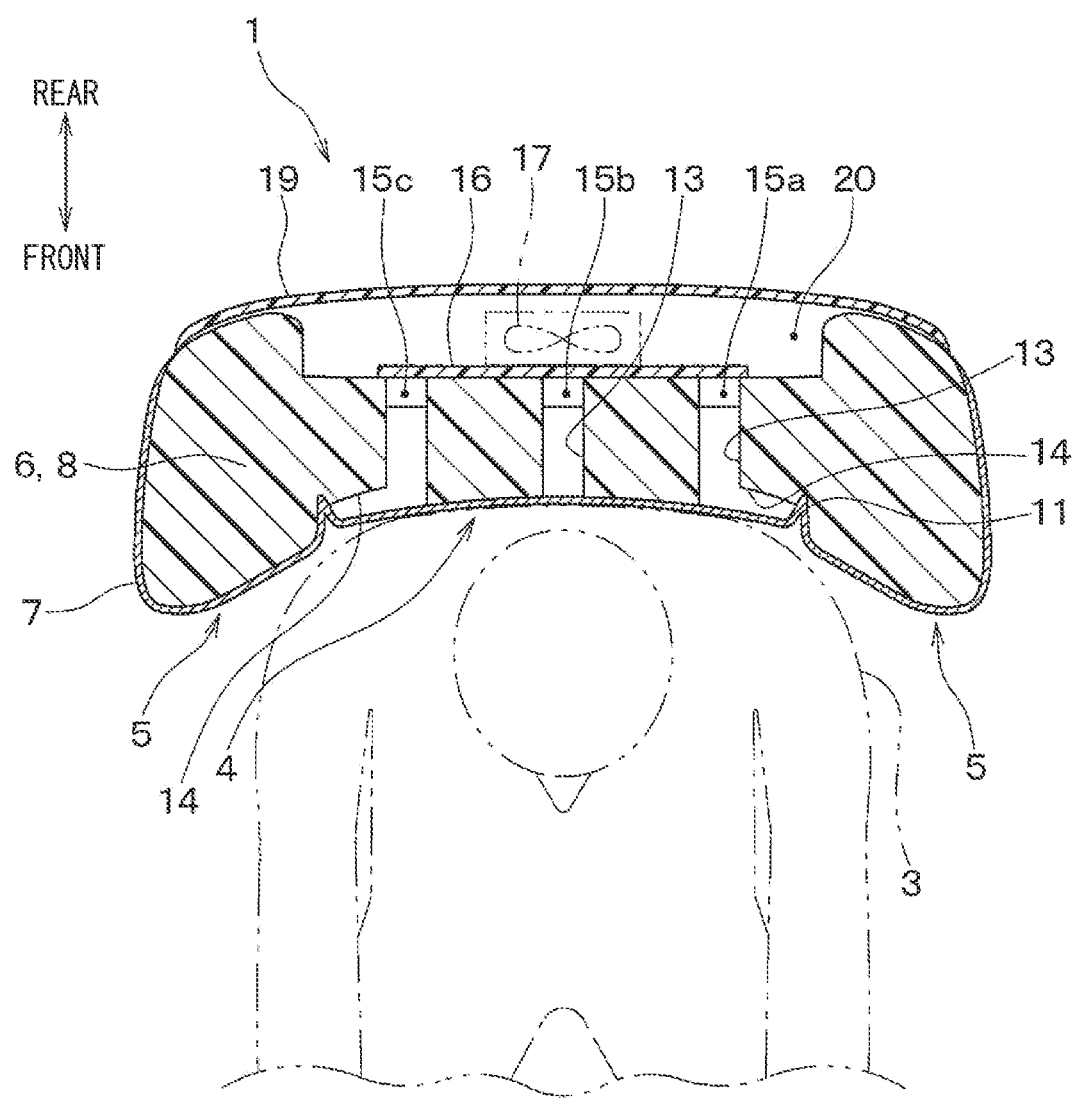
FIG. 12 is a cross-sectional view taken along line XII-XII in FIG. 11 while the outer cover is shown in the cross-sectional view.
Figure 13:
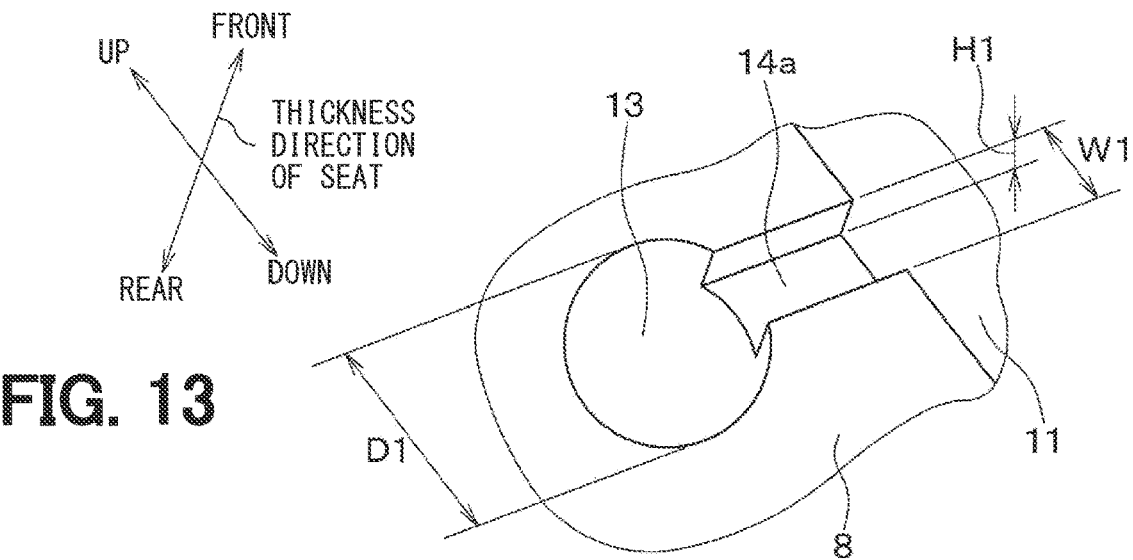
FIG. 13 is a perspective view showing an example of a surface groove of the seat air-conditioning device of the second embodiment.
Figure 14:
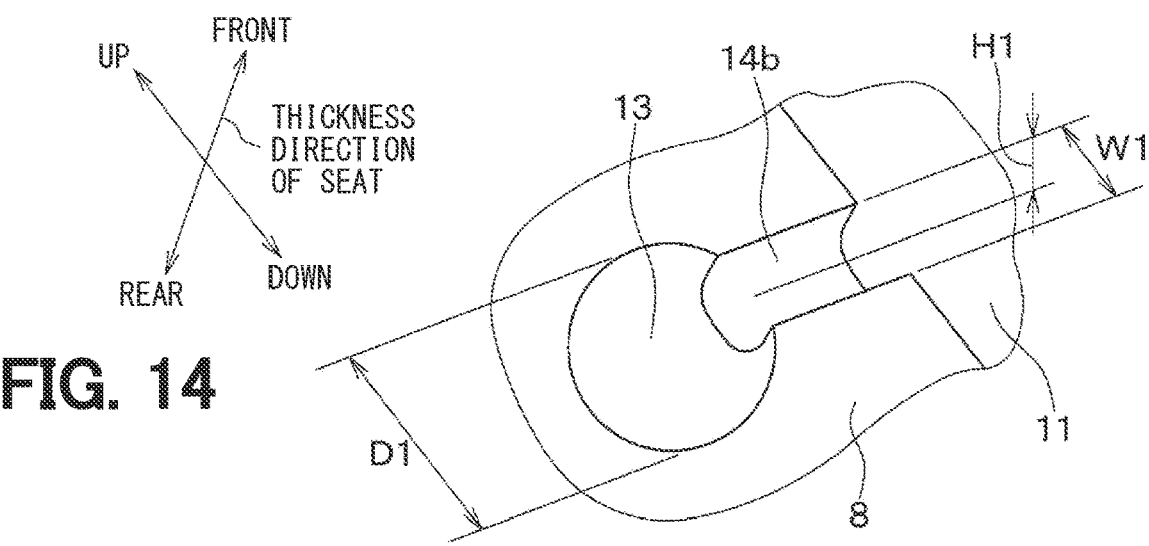
FIG. 14 is a perspective view showing another example of the surface groove of the seat air-conditioning device of the second embodiment.
Figure 15:
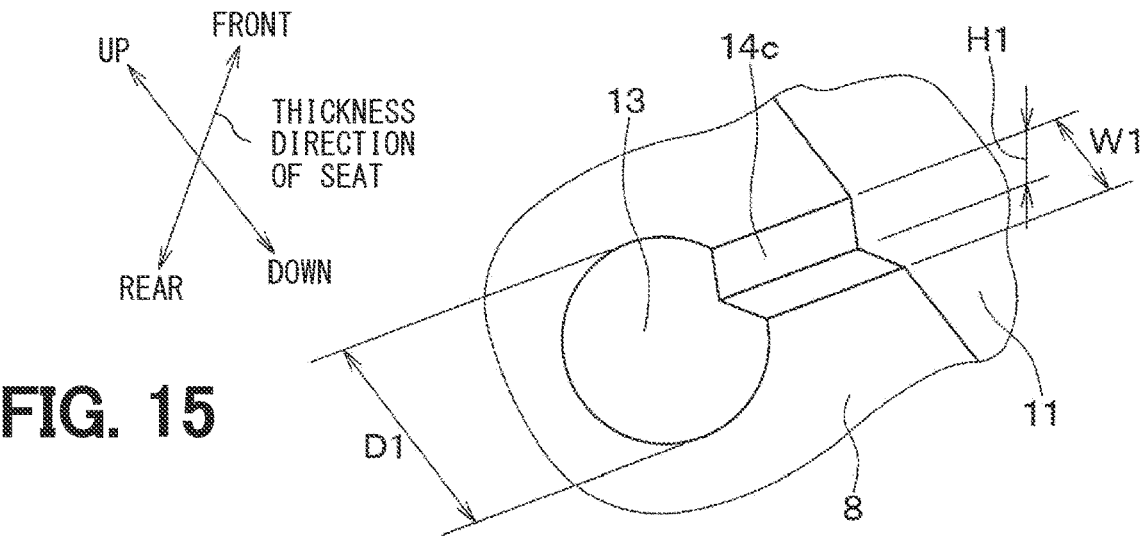
FIG. 15 is a perspective view showing another example of the surface groove of the seat air-conditioning device of the second embodiment.
Figure 16:
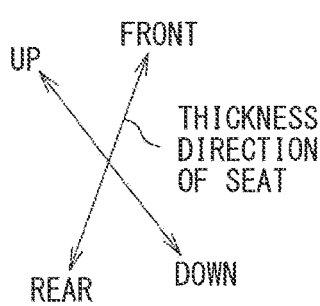
FIG. 16 is a perspective view showing another example of the surface groove of the seat air-conditioning device of the second embodiment.
Figure 16:
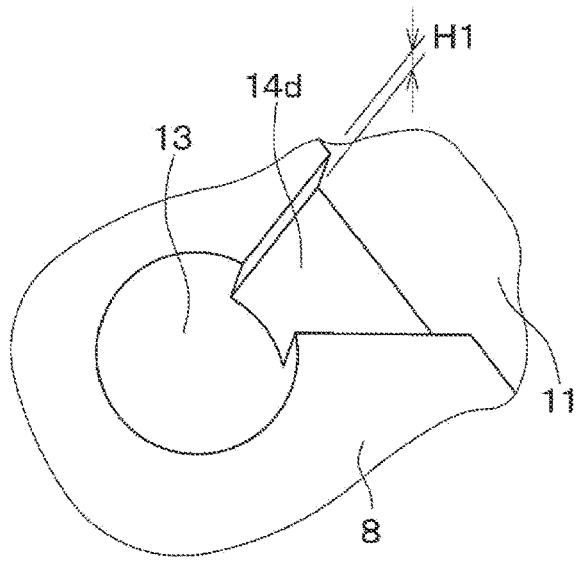
Figure 17:
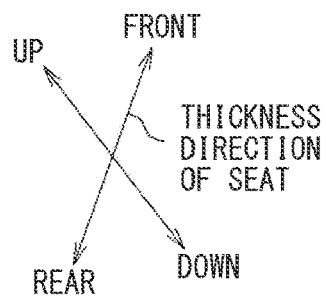
FIG. 17 is a perspective view showing another example of the surface groove of the seat air-conditioning device of the second embodiment.
Figure 17:
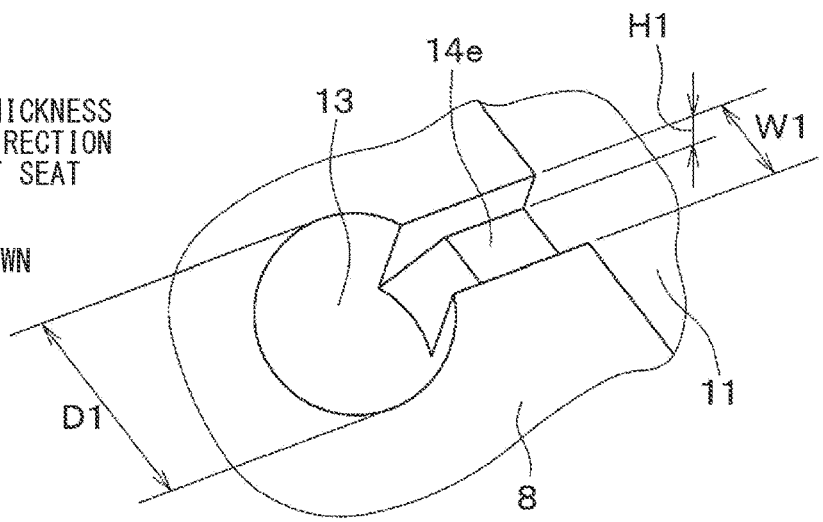

As shown in FIGS. 11 and 12, in the second embodiment, the cushion material 6 of the seat back 1 is formed by the seat pad 8 (i.e., the cushion material 6 is formed integrally in one-piece by the seat pad 8) and does not include the soft urethane foam layer 9 and the three-dimensional net. The seat pad 8 is made of, for example, the urethane foam as in the first embodiment. Therefore, in the second embodiment, each of the surface grooves 14 is formed as a recess (or a cutout) at a portion of the seat pad 8, which is adjacent to the outer cover 7. At the time of molding the seat pad 8, the ventilation holes 13 and the surface grooves 14 may be formed at the seat pad 8.

Even in the second embodiment, each of the surface grooves 14 extends from the corresponding ventilation hole 13 to the corresponding low-pressure side portion of the cushion material 6, at which the seating pressure of the occupant 3 is relatively low, without extending to the high-pressure side portion of the cushion material 6, at which the seating pressure of the occupant is relatively high. Specifically, each of the surface grooves 14 extends from the corresponding one of the ventilation holes 13 to the corresponding one of the side supports 5 or the corresponding one of the hanging grooves 11.

FIGS. 13 to 18 show examples of the shape of the surface groove 14 of the seat air-conditioning device of the second embodiment.

Since all of the examples shown in FIGS. 13 to 18 respectively have the same shapes as those of the examples shown in FIGS. 5 to 10 in the first embodiment, the description of these shapes will be omitted for the sake of simplicity. Any one of the various shapes as discussed in the first embodiment can be used as the shape of the surface grooves 14 of the seat air-conditioning device of the second embodiment.

However, each of the surface grooves 14 of the first embodiment is the recess (or the cutout) formed at the part of the soft urethane foam layer 9 by, for example, cutting off the part of the soft urethane foam layer 9. In contrast, in the second embodiment, each of the surface grooves 14 is formed as the recess (or the cutout) at the part of the seat pad 8, which is adjacent to the outer cover 7, through the molding or the like.

Even in the second embodiment, like in the first embodiment, the depth H1 of the surface groove 14 measured in the thickness direction of the seat is set to be small enough to the extent that does not cause the substantial influence on the seating comfort of the occupant 3. The width W1 of the surface groove 14, which is measured in the direction parallel with the surface of the seat, is preferably set to be equal to or smaller than the half of the diameter D1 of the ventilation hole 13.

Next, there will be described a result of an experiment in view of the flow rate of the air for the seat air-conditioning device of the second embodiment and a seat air-conditioning device of a comparative example.

Although not shown, the seat air-conditioning device of the comparative example used in the experiment is applied to the seat back 1 and includes the cushion material 6, the outer cover 7 and the ventilation holes 13. The cushion material 6 is formed by the seat pad 8. As a difference between the comparative example and the second embodiment, the seat air-conditioning device of the comparative example does not include the surface grooves 14.

Figure 18:
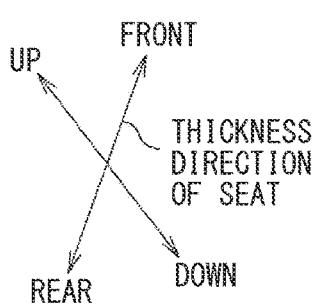
FIG. 18 is a perspective view showing another example of the surface groove of the seat air-conditioning device of the second embodiment.
Figure 18:
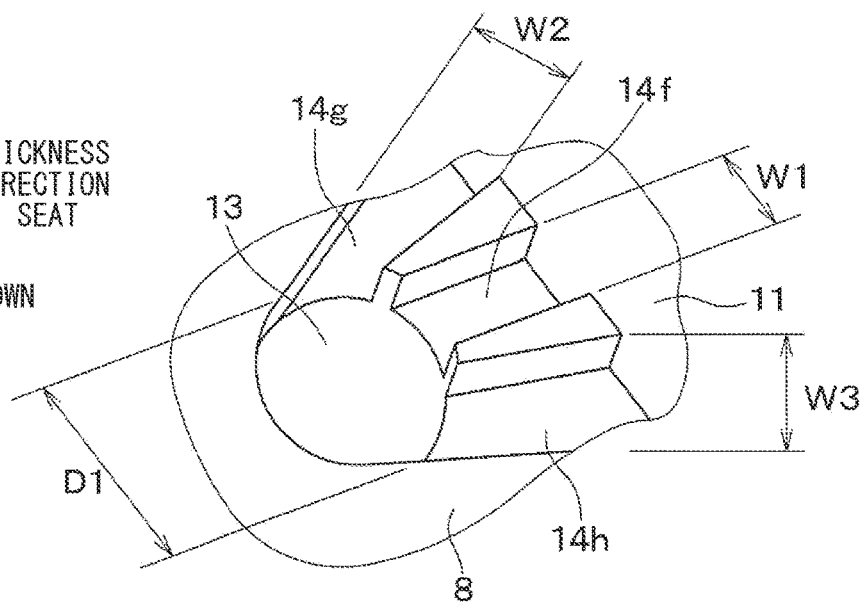

On the other hand, the seat air-conditioning device of the second embodiment used in the experiment includes the surface grooves 14f, 14g, 14h having the shape described with reference to FIG. 18. That is, in the seat air-conditioning device, the three surface grooves 14f, 14g, 14h are provided to each of the corresponding ventilation holes 13. Furthermore, in this experiment, a human body dummy was seated on the seat.

Then, there is plotted the results of measurements of the flow rate of the air generated by the blower 17 obtained by changing the duty ratio of the electric current supplied to the electric motor of the blower 17 for each of the seat air-conditioning device of the second embodiment and the seat air-conditioning device of the comparative example.

Figure 19:
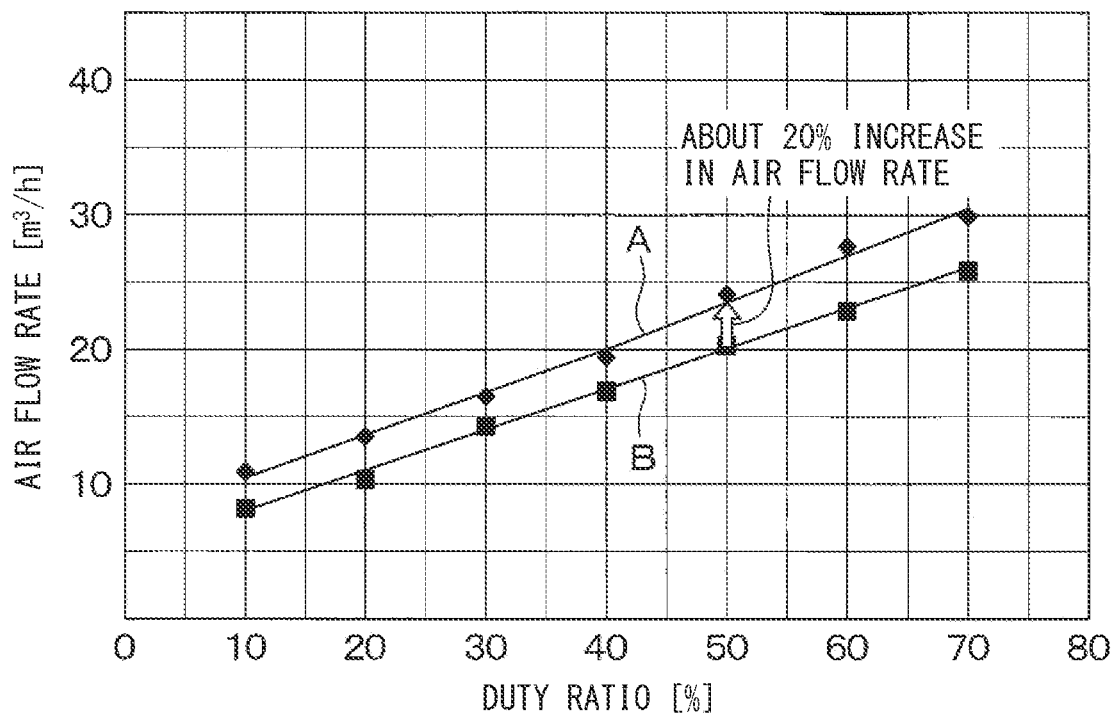
FIG. 19 is a graph showing a relationship between a duty ratio of an electric current supplied to an electric motor of a blower and an air flow rate for the seat air-conditioning device of the second embodiment and a seat air-conditioning device of a comparative example.

In FIG. 19, the experimental results of the seat air-conditioning device of the second embodiment are indicated by a solid line A, and the experimental results of the seat air-conditioning device of the comparative example are indicated by a solid line B.

From the graph of FIG. 19, it can be seen that in the seat air-conditioning device of the second embodiment, the flow rate of the air is increased by about 20% at each of the duty ratios of the electric current supplied to the electric motor of the blower 17 in comparison to the seat air-conditioning device of the comparative example. Therefore, in the seat air-conditioning device of the second embodiment, when some of the perforation holes 10, which are located on the side of the ventilation holes 13 in the axial direction of the ventilation holes 13, are blocked by the back of the occupant 3, it is possible to increase the flow rate of the air, which flows in the vicinity of the back of the occupant 3, as compared with the seat air-conditioning device of the comparative example.

The seat air-conditioning device of the second embodiment described above can also provide advantages, which are similar to those of the seat air-conditioning device of the first embodiment. That is, by forming the surface grooves 14 at the cushion material 6, the occupant 3 can feel cooler, and thereby the occupant 3 can feel more comfortable. Furthermore, the surface grooves 14 hardly affect the seating comfort of the occupant 3.

Third Embodiment

Next, a third embodiment will be described. The third embodiment is a modification of the installing portion for installing the seat air-conditioning device to the seat, and the rest of the third embodiment is the same as that of the first embodiment. Therefore, only the portions, which are different from those of the first embodiment, will be described in the following description.

Figure 20:
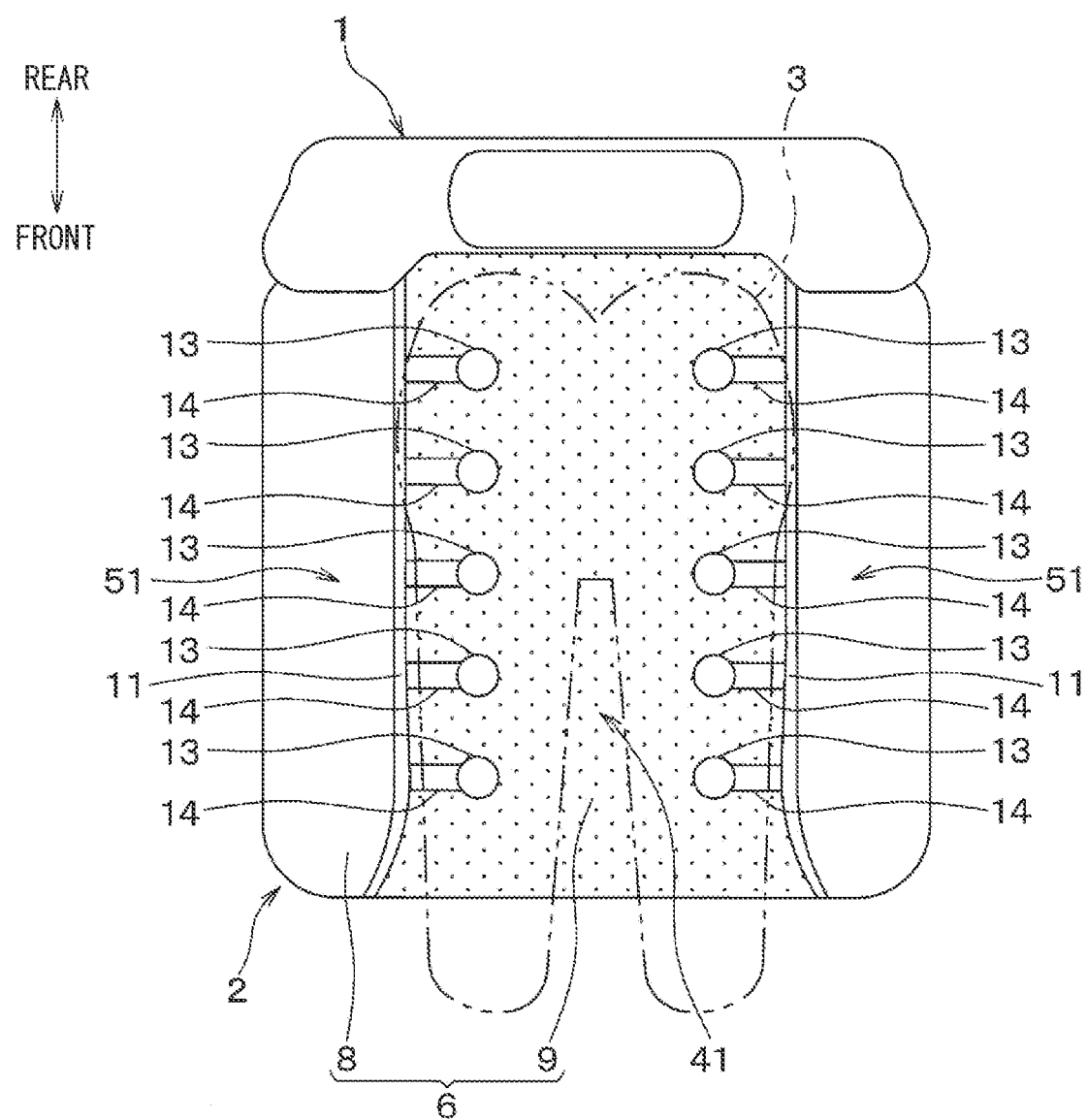
FIG. 20 is a plan view showing a seat cushion, to which a seat air-conditioning device of a third embodiment is applied, in a state where an outer cover is removed from the seat cushion.

As shown in FIG. 20, the seat air-conditioning device of the third embodiment is installed to the seat cushion 2. The seat cushion 2 includes: a center portion 41 which is placed to oppose the buttocks of the occupant 3 seated on the seat; and two side supports 51 which are located on two opposite sides, respectively, of the center portion 41.

The seat cushion 2 of the third embodiment includes: the cushion material 6 which is configured to support the buttocks of the occupant 3 seated on the seat; and the outer cover (not shown) which covers the cushion material 6. FIG. 20 shows a state where the outer cover of the seat cushion 2 is removed.

The cushion material 6 includes the seat pad 8 and the soft urethane foam layer 9. The three-dimensional net may be used in place of the soft urethane foam layer 9. The cushion material 6 may be formed only by the seat pad 8 (i.e., the cushion material 6 may be formed integrally in one-piece by the seat pad 8).

Although not shown, the outer cover has the perforation holes at least in the center portion 41. Furthermore, some of the hanging grooves 11 are respectively provided at two boundaries, each of which is located between the center portion 41 and a corresponding one of the side supports 51.

The seat air-conditioning device of the third embodiment includes a plurality of ventilation holes 13 and a plurality of surface grooves 14 formed at the cushion material 6 of the seat cushion 2.

The ventilation holes 13 are formed at the center portion 41 of the cushion material 6. Each of the ventilation holes 13 extends in the up-to-down direction (i.e., a thickness direction of the seat cushion 2).

The surface grooves 14 are formed at a portion of the cushion material 6 which is adjacent to the outer cover. The depth of each of the surface grooves 14 is relatively small to the extent that does not cause the substantial influence on the seating comfort of the occupant 3.

Each of the surface grooves 14 extends from the corresponding ventilation hole 13 in a direction away from the center of the buttocks of the occupant 3 seated on the seat. Specifically, each of the surface grooves 14 extends from the corresponding one of the ventilation holes 13 to the corresponding one of the side supports 51 or the corresponding one of the hanging grooves 11. Each of the surface grooves 14 communicates between the corresponding one of the hanging grooves 11 and the corresponding one of the ventilation holes 13.

The portion of the cushion material 6, which is spaced away from the center of the buttocks of the occupant 3 seated on the seat, has the seating pressure that is lower than the seating pressure of a portion of the cushion material 6 which contacts the buttocks of the occupant 3. Specifically, the side supports 5 or the hanging grooves 11 are portions that have the seating pressure which is lower than the seating pressure of the center portion 41. Even in the third embodiment, each of the surface grooves 14 extends from the corresponding ventilation hole 13 to the corresponding low-pressure side portion of the cushion material 6, at which the seating pressure of the occupant 3 is relatively low, without extending to the high-pressure side portion of the cushion material 6, at which the seating pressure of the occupant is relatively high.

The seat air-conditioning device of the third embodiment described above can also provide advantages, which are similar to those of the seat air-conditioning device of the first embodiment. That is, by forming the surface grooves 14 at the cushion material 6 of the seat cushion 2, the occupant 3 can feel cooler, and thereby the occupant 3 can feel more comfortable. Furthermore, the surface grooves 14 hardly affect the seating comfort of the occupant 3.

Other Embodiments (1) In each of the above embodiments, the seat air-conditioning device is configured such that when the blower 17 is driven, the air is suctioned from the perforation holes 10 of the outer cover 7 through the surface grooves 14 and the ventilation holes 13. However, the present disclosure is not limited to this configuration. The seat air-conditioning device may be configured such that when the blower 17 is driven, the air is blown out from the perforation holes 10 of the outer cover 7 through the ventilation holes 13 and the surface grooves 14.

(2) In each of the above embodiments, the seat air-conditioning device is configured such that the blower 17 is installed in the seat back space 20 between the back lid 16 and the back frame 19. However, the present disclosure is not limited to this configuration. The seat air-conditioning device may be configured such that the blower 17 is installed at a place, such as a lower portion of the seat cushion 2, which is other than the seat back space 20.

(3) In each of the above embodiments, the shapes of the surface grooves 14 of the seat air-conditioning device are described with reference to FIGS. 5 to 10 or FIGS. 13 to 18. However, the present disclosure is not limited to these shapes. Various other shapes may be adapted as the shapes of the surface grooves 14. Furthermore, the number of the surface grooves 14 may also be arbitrarily set.

Various shapes and numbers of the ventilation holes 13 and of the rear groove(s) 15 may also be employed.

(4) In each of the above embodiments, it is described that the width W1 of the surface groove 14, which is measured in the direction parallel with the surface of the seat, is preferably set to be equal to or smaller than the half of the diameter D1 of the ventilation hole 13. However, the present disclosure is not limited to this setting. For example, the width W1 of the surface groove 14, which is measured in the direction parallel with the surface of the seat, may be set to be equal to or larger than the half of the diameter D1 of the ventilation hole 13 to the extent that does not cause the substantial influence on the seating comfort of the occupant 3.

The present disclosure is not limited to the above-described embodiments and may be modified appropriately. Further, the above embodiments are not unrelated to each other and can be appropriately combined unless the combination is clearly impossible. Needless to say, in each of the above-described embodiments, the elements of the embodiment are not necessarily essential except when it is clearly indicated that they are essential and when they are clearly considered to be essential in principle. In each of the above embodiments, when a numerical value such as the number, numerical value, amount, range or the like of the constituent elements of the embodiment is mentioned, the present disclosure should not be limited to such a numerical value unless it is clearly stated that it is essential and/or it is required in principle. In each of the above embodiments, when the shape, the positional relationship or the like of the constituent elements of the embodiment are mentioned, the present disclosure should not be limited the shape, the positional relationship or the like unless it is clearly stated that it is essential and/or it is required in principle.

CONCLUSION

According to a first aspect shown in part or all of the above embodiments, a seat air-conditioning device, which is applied to a seat installed in a cabin of a vehicle, includes a cushion material, an outer cover, a ventilation hole and a surface groove. The cushion material is configured to support a back or buttocks of an occupant seated on the seat. The outer cover covers the cushion material and has a plurality of perforation holes. The ventilation hole is formed at a portion of the cushion material which is opposed to the back or the buttocks of the occupant seated on the seat. The ventilation hole is configured to suction or blow air. The surface groove is formed at a portion of the cushion material which is adjacent to the outer cover. The surface groove is communicated with the ventilation hole and extends from the ventilation hole in a direction away from a location of the cushion material, at which a center of the back or a center of the buttocks of the occupant seated on the seat is placed.

According to a second aspect, the seat includes: a center portion which is placed to oppose the back or the buttocks of the occupant seated on the seat; and two side supports which are placed on two opposite sides, respectively, of the center portion. A hanging groove, which is configured to couple between the cushion material and the outer cover, is formed at a boundary between the center portion and one of the two side supports. The ventilation hole and the surface groove are formed at the center portion. The surface groove extends from the ventilation hole to the one of the two side supports or the hanging groove.

According to this configuration, in, for example, the seat back, the side support or hanging groove is the portion where the seating pressure of the occupant seated on the seat is relatively low. Therefore, the surface groove extends to the low-pressure side portion of the cushion material, at which the seating pressure of the occupant is relatively low, and also the depth of the surface groove is smaller than the depth of the ventilation hole. Therefore, the seating comfort of the occupant is hardly affected.

Furthermore, even when some of the perforation holes, which are placed on the side of the ventilation hole in the axial direction of ventilation hole, are blocked by the body of the occupant, the air flows from the other perforation holes, which are placed at the location where the surface groove is placed, to the ventilation hole through the surface groove. Therefore, it is possible to limit a decrease in the flow rate of the air which flows in the vicinity of the body of the occupant.

According to a third aspect, the surface groove communicate between the hanging groove and the ventilation hole.

According to this configuration, even when some of the perforation holes, which are placed on the side of the ventilation hole in the axial direction of ventilation hole, are blocked by the body of the occupant, the air flows from the other perforation holes, which are placed at the location where the surface groove communicated with the hanging groove is placed, to the surface groove and the ventilation hole through the hanging groove. Therefore, it is possible to limit a decrease in the flow rate of the air which flows in the vicinity of the body of the occupant.

According to a fourth aspect, a width of the surface groove, which is measured in a direction parallel with a surface of the seat, is progressively increased from the ventilation hole toward the one of the two side supports or the hanging groove.

According to this configuration, the flow passage cross-sectional area of the portion of the surface groove, at which the seating pressure of the occupant is relatively low, is increased, and thereby the flow rate of the air, which flows from the surface groove to the ventilation hole, can be increased without causing the substantial influence on the seating comfort of the occupant.

According to a fifth aspect, the surface groove has a portion that has a depth which is measured in a thickness direction of the seat and is progressively increased from a side, at which the one of the two side supports or the hanging groove is placed, toward the ventilation hole.

According to this configuration, the flow rate of the air, which flows from the surface groove to the ventilation hole, can be further increased by reducing the pressure loss of the air, which flows from the surface groove to the ventilation hole, without causing the substantial influence on the seating comfort of the occupant.

According to a sixth aspect, the surface groove is formed as only one surface groove or one of a plurality of surface grooves communicated with the ventilation hole.

By providing only the one surface groove for the one ventilation hole, the configuration can be simplified, and the influence on the seating comfort of the occupant can be reduced.

Furthermore, by providing the plurality of surface grooves for the one ventilation hole, it is possible to increase the total flow passage cross-sectional area, which is the sum of the flow passage cross-sectional areas of the plurality of surface grooves, while the width of each of the plurality of surface grooves is kept small. As a result, a total flow rate of the air, which flows from the plurality of surface grooves to the ventilation hole, can be further increased without causing the substantial influence on the seating comfort of the occupant.

According to a seventh aspect, the cushion material includes: a seat pad; and one of a soft urethane foam layer or a three-dimensional net located on a side of the seat pad where the outer cover is placed. The surface groove is a cutout formed at a part of the one of the soft urethane foam layer or the three-dimensional net.

According to this configuration, the surface groove can be easily formed by processing the soft urethane foam layer or the three-dimensional net.

According to an eighth aspect, the cushion material includes a seat pad. The surface groove is a recess that is recessed at a portion of the seat pad, which is adjacent to the outer cover.

According to this configuration, the surface groove and the ventilation holes can be formed together at the time of molding the seat pad.

According to a ninth aspect, the surface groove extends from the ventilation hole to a low-pressure side portion of the cushion material, at which a seating pressure of the occupant seated on the seat is relatively low, without extending to a high-pressure side portion of the cushion material, at which the seating pressure of the occupant seated on the seat is relatively high.

According to this configuration, even when some of the perforation holes, which are placed on the side of the ventilation hole in the axial direction of ventilation hole, are blocked by the body of the occupant, the air flows from the other perforation holes, which are placed at the location where the surface groove is placed, to the ventilation hole through the surface groove. Thus, since the decrease in the flow rate of the air, which flows in the vicinity of the body of the occupant, is limited, the occupant can feel cooler, and thereby the occupant can feel more comfortable.

Furthermore, the surface groove does not extend to the high-pressure side portion of the cushion material, at which the seating pressure of the occupant is relatively high, and also the depth of the surface groove is smaller than the depth of the ventilation hole. Therefore, the seating comfort of the occupant is hardly affected.

What is claimed is:

1. A seat air-conditioning device applied to a seat installed in a cabin of a vehicle, comprising:
    a cushion material that is configured to support a back or buttocks of an occupant seated on the seat;
    an outer cover that covers the cushion material and has a plurality of perforation holes;
    a ventilation hole that is formed at a portion of the cushion material which is opposed to the back or the buttocks of the occupant seated on the seat, wherein the ventilation hole is configured to suction or blow air; and
    a surface groove that is formed at a portion of the cushion material which is adjacent to the outer cover, wherein the surface groove is communicated with a portion of the ventilation hole, which is placed adjacent to the outer cover, and the surface groove extends from the ventilation hole in a direction away from a location of the cushion material, at which a center of the back or a center of the buttocks of the occupant seated on the seat is placed, while the surface groove is unbent along an entire extent of the surface groove, wherein:
    the seat includes:
        a center portion which is placed to oppose the back or the buttocks of the occupant seated on the seat; and
        two side supports which are placed on two opposite sides, respectively, of the center portion;
    a hanging groove, which is configured to couple between the cushion material and the outer cover, is formed at a boundary between the center portion and one of the two side supports;
    the ventilation hole and the surface groove are formed at the center portion; and
    the surface groove extends from the ventilation hole to the one of the two side supports or the hanging groove.

2. The seat air-conditioning device according to claim 1, wherein the surface groove communicates between the hanging groove and the ventilation hole.

3. The seat air-conditioning device according to claim 1, wherein a width of the surface groove, which is measured in a direction parallel with a surface of the seat, is progressively increased from the ventilation hole toward the one of the two side supports or the hanging groove.

4. The seat air-conditioning device according to claim 1, wherein the surface groove has a portion that has a depth which is measured in a thickness direction of the seat and is progressively increased from a side, at which the one of the two side supports or the hanging groove is placed, toward the ventilation hole.

5. The seat air-conditioning device according to claim 1, wherein the surface groove is formed as only one surface groove or one of a plurality of surface grooves communicated with the ventilation hole.

6. The seat air-conditioning device according to claim 1, wherein:
    the cushion material includes:
        a seat pad; and
        one of a soft urethane foam layer or a three-dimensional net located on a side of the seat pad where the outer cover is placed; and
    the surface groove is a cutout which is formed at a part of the one of the soft urethane foam layer or the three-dimensional net and extends through the part of the one of the soft urethane foam layer or the three-dimensional net in a thickness direction of the one of the soft urethane foam layer or the three-dimensional net.

7. The seat air-conditioning device according to claim 1, wherein:
    the cushion material includes a seat pad; and
    the surface groove is a recess that is recessed at a portion of the seat pad, which is adjacent to the outer cover.

8. The seat air-conditioning device according to claim 1, wherein the surface groove extends from the ventilation hole to a low-pressure side portion of the cushion material, at which a seating pressure of the occupant seated on the seat is relatively low, without extending to a high-pressure side portion of the cushion material, at which the seating pressure of the occupant seated on the seat is relatively high.

\* \* \* \* \*